US012618695B2

(12) United States Patent
    Someya

(10) Patent No.: US 12,618,695 B2
(45) Date of Patent: May 5, 2026

(54) PRINTING APPARATUS, CONTROL METHOD FOR PRINTING APPARATUS, AND COMPUTER-READABLE STORAGE MEDIUM STORING COMPUTER-EXECUTABLE INSTRUCTIONS FOR PRINTING APPARATUS

(71) Applicant: BROTHER KOGYO KABUSHIKI KAISHA, Nagoya (JP)

(72) Inventor: Masaru Someya, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 135 days.

(21) Appl. No.: 18/421,083

(22) Filed: Jan. 24, 2024

(65) Prior Publication Data

US 2024/0247957 A1      Jul. 25, 2024

(30) Foreign Application Priority Data

Jan. 24, 2023    (JP) ................................ 2023-008608

(51) Int. Cl.
    G01D 5/347 (2006.01)
    B41J 2/175 (2006.01)
    (Continued)

(52) U.S. Cl.
    CPC ...... G01D 5/34715 (2013.01); B41J 2/17526 (2013.01); B41J 25/005 (2013.01);
    (Continued)

(58) Field of Classification Search
    CPC ... G01D 5/34715; G01D 3/08; B41J 2/17526; B41J 25/005; B41J 19/207; B41J 29/393;
    (Continued)

(56) References Cited

U.S. PATENT DOCUMENTS

2007/0070118 A1*  3/2007  Nakata .................. B41J 19/207
                                                   347/37
2011/0220781 A1*  9/2011  Batchelder ......... G01D 5/34715
                                                   250/231.13

FOREIGN PATENT DOCUMENTS

JP        2006256713 A      9/2006
JP        2010284924 A     12/2010
                (Continued)

*Primary Examiner* — Jason S Uhlenhake
*Assistant Examiner* — Alexander D Shenderov
(74) *Attorney, Agent, or Firm* — Scully, Scott, Murphy & Presser, P.C.

(57) ABSTRACT

A printing apparatus includes a head, a carriage, an encoder including a scale, a first light emitting element and a first light receiving element, a measuring sensor including a second light emitting element and a second light receiving element, and a controller. The controller is configured to perform a printing operation of causing the head to eject ink while moving the carriage based on a signal output by the encoder, a measuring operation of moving the carriage based on a signal output by the encoder, causing the second light emitting element to emit light onto a measuring position of the scale, and receiving light reflected from or passing through the measuring position using the second light receiving element, and a calculating operation of calculating lifetime of the scale based on a light amount received by the second light receiving element.

21 Claims, 14 Drawing Sheets

(51) Int. Cl.
     *B41J 25/00*          (2006.01)
     *G01D 3/08*          (2006.01)
     *G01J 3/02*          (2006.01)

(52) U.S. Cl.
     CPC .............. *G01D 3/08* (2013.01); *G01J 3/0264*
              (2013.01); *G01J 3/027* (2013.01); *G01J*
                           *3/0275* (2013.01)

(58) Field of Classification Search
     CPC ........ B41J 2/125; B41J 25/001; G01J 3/0264;
                           G01J 3/027; G01J 3/0275
     USPC .......................................................... 347/19
     See application file for complete search history.

(56) References Cited

FOREIGN PATENT DOCUMENTS

| | | | |
|---|---|---|---|
| JP | 2011056791 | A | 3/2011 |
| JP | 2022164432 | A | 10/2022 |

* cited by examiner

REAR

LEFT ←—|—→ RIGHT

FRONT

1

PRINTING APPARATUS, CONTROL METHOD FOR PRINTING APPARATUS, AND COMPUTER-READABLE STORAGE MEDIUM STORING COMPUTER-EXECUTABLE INSTRUCTIONS FOR PRINTING APPARATUS

REFERENCE TO RELATED APPLICATIONS

This application claims priority from Japanese Patent Application No. 2023-008608 filed on Jan. 24, 2023. The entire content of the priority application is incorporated herein by reference.

BACKGROUND ART

The present disclosures relate to a printing apparatus, a control method for the printing apparatus, and a computer-readable storage medium storing computer-executable instructions for the printing apparatus.

There has been known a recording apparatus (hereafter, referred to as a conventional recording apparatus) provided with a recording head configured to eject ink droplets to a recording sheet, and a carriage configured to move the recording head in a particular direction (hereafter, referred to as an X-direction). Such a recording apparatus is typically provided with an encoder sensor to detect a movement of the carriage with respect to the recording apparatus. The recording apparatus controls the recording head to eject the ink droplets toward the sheet, while moving the carriage (i.e., the recording head) based on a detection signal of the encoder sensor, thereby forming an image on the sheet.

DESCRIPTION

In the aforementioned conventional recording apparatus, light-transmitting and light-blocking areas arranged along the X-direction of the encoder scale are detected by the encoder sensor, and a moving operation and an ink ejecting operation of the carriage are controlled based on detection results of the encoder sensor. According to such a configuration, since the recording head ejects the ink droplets with being moved, there could be a case where mists of the ink may float and adhered to the encoder scale. In such a case, a detection accuracy of the encoder sensor is lowered and misalignments of landing positions of the ink droplets may occur. Then, deterioration such as exhibition of white lines on an image as printed by occur, and a lifetime of the recording apparatus may be shortened.

According to aspects of the present disclosures, there is provided a printing apparatus including a head configure to eject ink on a recording medium, a carriage including the head, an encoder including a scale, a first light emitting element and a first light receiving element, the scale being elongated along a moving direction of the carriage, the first light emitting element being mounted on the carriage and configured to emit light toward the scale, the first light receiving element being mounted on the carriage and configured to receive light which is emitted from the first light emitting element and reflected from or passing through the scale, the encoder being configured to output a signal corresponding to a light amount received by the first light receiving element, a measuring sensor including a second light emitting element and a second light receiving element, the second light emitting element being mounted on the carriage and configured to emit light toward the scale, the second light receiving element being mounted on the carriage and configured to receive light which is emitted from the second light emitting element and reflected from or passing through the scale, and a controller. The configured is configured to perform a printing operation of causing the head to eject ink while moving the carriage based on a signal output by the encoder to form an image on the recording medium, a measuring operation of moving the carriage based on a signal output by the encoder, causing the second light emitting element to emit light onto a measuring position of the scale, and receiving light reflected from or passing through the measuring position using the second light receiving element, and a calculating operation of calculating lifetime of the scale based on a light amount received by the second light receiving element.

According to aspects of the present disclosures, there is provided a control method for a printing apparatus including a head configure to eject ink on a recording medium, a carriage including the head, an encoder including a scale, a first light emitting element and a first light receiving element, the scale being elongated along a moving direction of the carriage, the first light emitting element being mounted on the carriage and configured to emit light toward the scale, the first light receiving element being mounted on the carriage and configured to receive light which is emitted from the first light emitting element and reflected from or passing through the scale, the encoder being configured to output a signal corresponding to an amount of light received by the first light receiving element, and a measuring sensor including a second light emitting element and a second light receiving element, the second light emitting element being mounted on the carriage and configured to emit light toward the scale, the second light receiving element being mounted on the carriage and configured to receive light which is emitted from the second light emitting element and reflected from or passing through the scale. The control method including causing the head to eject ink while moving the carriage based on a signal output by the encoder to form an image on the recording medium, moving the carriage based on a signal output by the encoder, causing the second light emitting element to emit light onto a measuring position of the scale, and receiving light reflected from or passing through the measuring position using the second light receiving element, and calculating lifetime of the scale based on an amount of light received by the second light receiving element.

According to aspects of the present disclosures, there is provided a non-transitory computer-readable storage medium for a printing apparatus including a head configure to eject ink on a recording medium, a carriage including the head, an encoder including a scale, a first light emitting element and a first light receiving element, the scale being elongated along a moving direction of the carriage, the first light emitting element being mounted on the carriage and configured to emit light toward the scale, the first light receiving element being mounted on the carriage and configured to receive light which is emitted from the first light emitting element and reflected from or passing through the scale, the encoder being configured to output a signal corresponding to an amount of light received by the first light receiving element, and a measuring sensor including a second light emitting element and a second light receiving element, the second light emitting element being mounted on the carriage and configured to emit light toward the scale, the second light receiving element being mounted on the carriage and configured to receive light which is emitted from the second light emitting element and reflected from or passing through the scale. The non-transitory computer-readable recording medium contains computer-executable instructions, the computer-executable instructions being configured to, when executed by a controller of the printing apparatus, cause the information processing device to perform causing the head to eject ink while moving the carriage based on a signal output by the encoder to form an image on the recording medium, moving the carriage based on a signal output by the encoder, causing the second light emitting element to emit light onto a measuring position of the scale, and receiving light reflected from or passing through the measuring position using the second light receiving element, and calculating lifetime of the scale based on an amount of light received by the second light receiving element.

DESCRIPTION

Printing Apparatus

Figure 1:
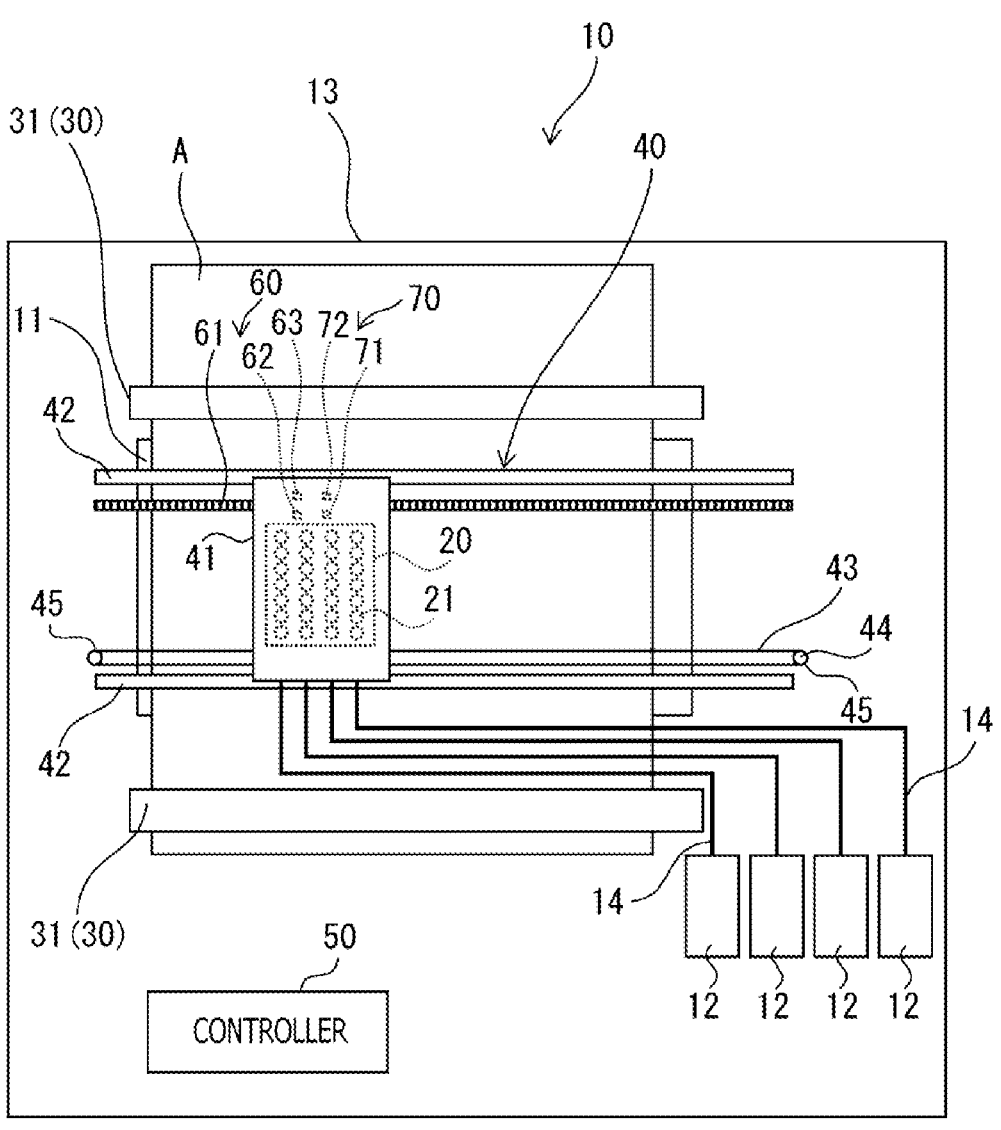
FIG. 1 schematically shows a plan view of a printing apparatus.
Figure 1:
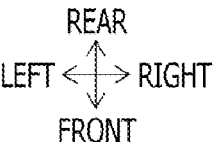

A printing apparatus according to an embodiment of the present disclosures is an inkjet printer, as shown in FIG. 1. The inkjet printer is configured to eject ink droplets from nozzles 21 of a head 20 toward a printing medium A. The printing medium A is, for example, a sheet-type medium such as paper of cloth.

The printing apparatus 10 is of a serial head type, and is provided with a head 20, a platen 11, a plurality of tanks 12, a casing 13, a conveying device 30, a moving device 40 and a controller 50. The moving device 40 has a carriage 41 mounting the head 20 thereon. It is noted that, in the following description, a direction in which the carriage 41 moves will be referred to as a right-left direction. Further, a direction intersecting with (e.g., perpendicular to) a moving direction (i.e., the right-left direction) of the carriage 41 and the direction in which the printing medium A is conveyed by the conveying device 30 will be referred to as a front-rear direction. Furthermore, a direction intersecting with (e.g., perpendicular to) the moving direction of the carriage 41 and the conveying direction of the printing medium A will be referred to as an up-down direction. It should be noted that the configuration of the printing apparatus 10 is not necessarily limited to the above-described one.

The casing 13 is configured to accommodate the head 20, the platen 11, the plurality of tanks 12, the conveying device 30, the moving device 40, and the controller 50. The platen 11 is arranged below the head 20 with a particular distance therebetween. An upper surface of the platen 11 is a planer surface, which is arranged to face a under surface of the head 20, and supports the printing medium A from the below.

Figure 2:
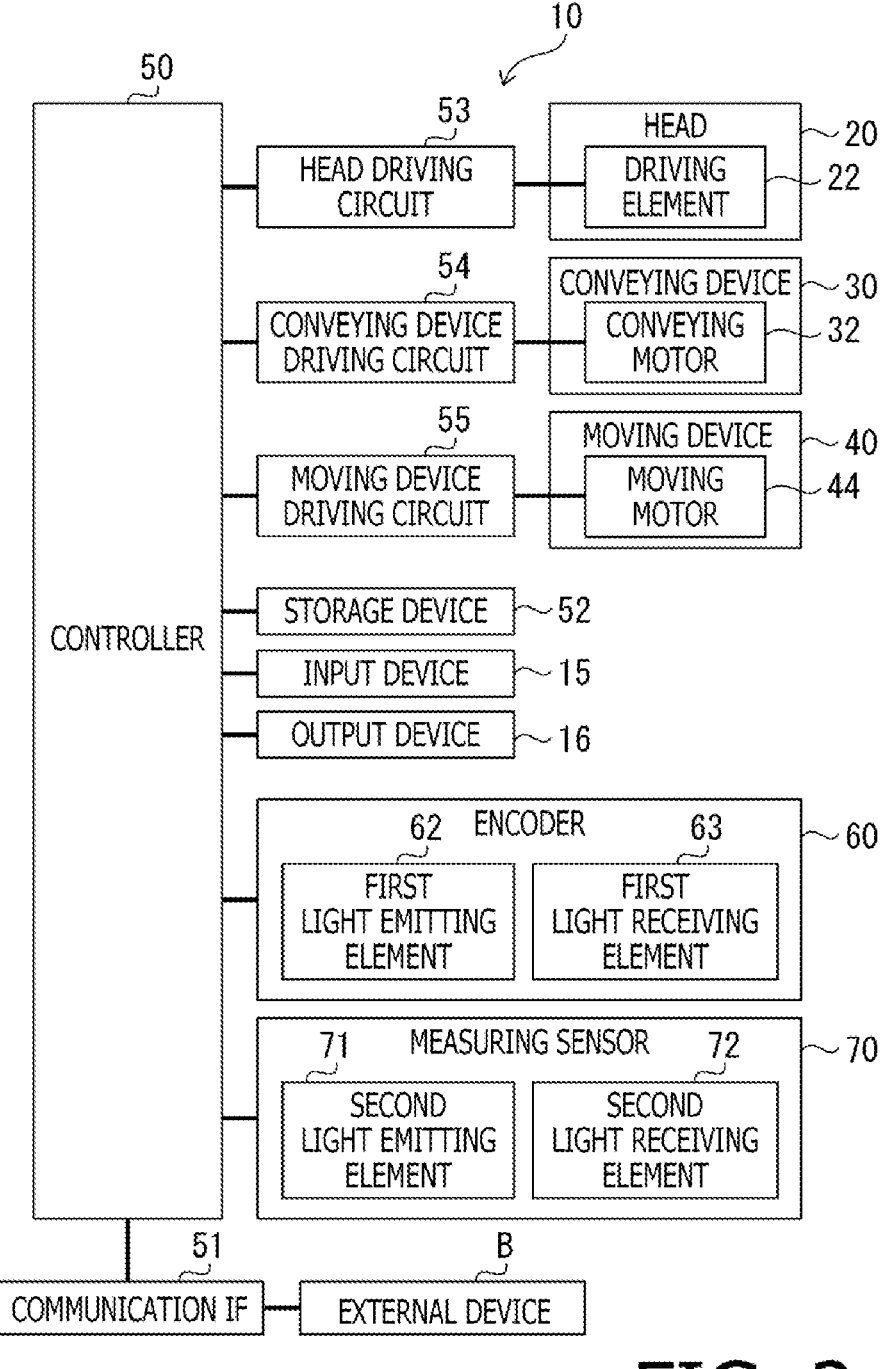
FIG. 2 is a block diagram showing a functional configuration of the printing apparatus.

The head 20 is formed with multiple nozzles 21 and multiple driving elements 22 corresponding to respective nozzles 21 (see FIG. 2). The multiple nozzles 21 are formed on an under surface of the head 20. The driving elements 22 are, for example, piezoelectric elements, heat-generating elements, or electrostatic actuators, and provided for respective nozzles 21. Each of the driving elements 22 applies a pressure to the ink inside the head 20 so that the ink is ejected from each of the nozzles 21.

The plurality of tanks 12 is a plurality of reservoirs each reserves ink to be supplied to the head 20. The multiple tanks 12 reserves different kinds of ink, respectively (e.g., cyan ink, magenta ink, yellow ink and black ink). Each tank 12 is connected to the head 20 through a flexible tube 14. The ink reserved in the tank 12 is conveyed to the head 20 through the tube 14.

The conveying device 30 has, for example, a conveying roller 31 (see FIG. 1) and a conveying motor 32 (see FIG. 2). The conveying roller 31 has a shaft extending in the right-left direction, and the conveying motor 32 is connected to the shaft of the conveying roller 31. In this configuration, when the conveying motor 32 is driven to rotate, the conveying roller 31 is rotates about its axis, thereby conveying the printing medium A on the platen 11 in the front-rear direction.

The moving device 40 has a carriage 41, a pair of guide rails 42, an endless belt 43, and a moving motor 44. The carriage 41 has a box-like casing 13 and mounts the head 20 thereon. The pair of guide rails 42 extends in the right-left direction as if it transverses above the platen 11 which is arranged immediately below the pair of guide rails 42. The guide rails 42 are arranged to be separated in the front-rear direction such that all the nozzles 21 are arranged therebetween, and support the carriage 41 so as to be movable in the right-left direction. The carriage 41 is fixed onto a particular position of the endless belt 43, and the endless belt 43 is wound around a pair of pulleys 45. One of the pulleys 45 is connected to a rotating shaft of the moving motor 44, and thus, the endless belt 43 is indirectly connected to the moving motor 44. Accordingly, the moving device 40 is configured such that, when the moving motor 44 is driven to rotate, the endless belt 43 runs accordingly, and the carriage 41 and the head 20 mounted on the carriage 41 are moved in the right-left direction along the pair of guide rails 42.

As shown in FIG. 2, the printing apparatus 10 further includes a controller 50, and a communication IF (interface) 51, a storage device 52, a head driving circuit 53, a conveying device driving circuit 54 and a moving device driving circuit 55 which are connected to the controller 50. The communication IF 51 is a connecting device configured to connect to an external device B which exists independently from the printing apparatus 10. Examples of the external device B may include a computer, a communication network, a storage medium, a display, printing apparatus other than the printing apparatus 10, and the like. The printing apparatus 10 is configured to obtain image data from the external device B through the communication IF 1. Examples of the image data includes raster data representing an image to be printed on the printing medium A.

The storage device 52 is a memory that can be accessible from the controller 50, and is configured to have at least one of a RAM, a ROM, an EEPROM, or an NVRAM. The storage device 52 is configured to store various types of data used for data processing performed by the controller and/or programs causing the controller 50 to perform various type of data processing.

Typically, the controller 50 is a computer provided with a processor such as a CPU, an integration circuit such as an ASIC, of both. By executing computer programs with reference to data stored in the storage device 52, the controller 50 controls operations of respective components of the printing apparatus 10. It is noted that the controller 50 may be configured with a single device, or may be configured such that multiple devices arranged in a distributed manner cooperate to perform an operation of the printing apparatus 10.

The head driving circuit 53 is electrically connected to driving elements 22 of the head 20. The controller 50 generates control signals to respectively drive the driving elements 22 based on the image data or the like. The head driving circuit 53 generates the driving signals based on the control signals thus generated. Then, each of the driving elements 22 is driven by the driving signals so that an appropriate ejection energy is applied to the ink inside the head 20 at a particular timing.

The conveying device driving circuit 54 is electrically connected to the conveying motor 32 of the conveying device 30. The controller 50 generates the control signal to control the conveying motor 32 based on the image data and the like, and the conveying device driving circuit 54 generates the driving signal based on the thus generated control signal. Then, the conveying motor 32 conveys, based on the driving signal, the printing medium A such that the printing medium A is conveyed intermittently or continuously on the platen 11 in the front-rear direction, while stopped at particular positions on the platen 11.

The moving device driving circuit 55 is electrically connected to the moving motor 44 of the moving device 40. The controller 50 generates the control signal to control the moving motor 44 based on the image data and the like, and the moving device driving circuit 55 generates the driving signal based on the thus generated control signal. Then, the moving motor 44 moves, based on the driving signal, the carriage 41 supporting the head 20 such that the carriage 41 moves in the right-left direction at a variable speed, while stopped at arbitrary positions within a moving range of the carriage 41.

The printing apparatus 10 is further provided with an input device 15 and an output device 16, which are electrically connected to the controller 50. The input device 15 is configured to input information to the controller 50. Examples of the input device 15 include push buttons, a pointing device, and the like. The output device 16 is configured to output information under control of the controller 50. Examples of the output device include a display configured to display (i.e., provide visual indications) information to be output.

Further, as shown in FIGS. 1 and 2, the printing apparatus 10 is provided with an encoder 60 and a measuring sensor 70. The encoder 60 has a scale 61, a first light emitting element 62, and a first light receiving element 63. The scale 61 has a rectangular shape elongated in the right-left direction and has light-blocking areas through which light does not penetrate, and light-transmitting areas through which light penetrates. The light-blocking areas and the light-transmitting areas are arranged alternately in the right-left direction. One example of the scale 61 is configured such that black printed sections of a particular size are formed on a transparent plastic tape at particular intervals in the right-left direction. In the scale 61 configured as above, the printed sections are used as the light-blocking areas, and transparent areas between two adjacent light-blocking areas are used as the light-transmitting areas.

The first light emitting element 62 and the first light receiving element 63 are mounted on the carriage 41, and is arranged such that the first light emitting element 62 and the first light receiving element 63 face each other with the scale 61 arranged therebetween. The first light emitting element 62 and the first light receiving element 63 are electrically connected to the controller 50, and the first light emitting element 62 is controlled to be driven by the controller 50. The first light emitting element 62 is, for example, a light emitting diode and is configured to emit light toward the scale 61.

When the light emitted from the first light emitting element 62 passes through the scale 61 and is incident on the first light receiving element 63, the encoder 60 outputs an encoder signal in accordance with a light amount received by the first light receiving element to the controller 50. The encoder signal includes an H-level signal and an L-level signal. The H-level signal is the encoder signal that is output when the light amount received by the first light receiving element is greater than or equal to a particular amount, and corresponds to the transparent area of the scale 61. The L-level signal is an encoder signal that is the encoder signal that is output when the light amount received by the first light receiving element is less than the particular amount, and corresponds to the light-blocking area of the scale 61. The controller 50 counts the H-level signals and the L-level signals output alternately and obtains a location of the carriage 41. Then, the controller 50 controls a location and a moving speed of the carriage 41, and ejection timings of the ink from the head 20.

The encoder 60 described above is a transmissive type, but a reflective type encoder may also be employed. When the encoder 60 is of the reflective type, the scale 61 may be configured to have light-blocking areas and light-reflecting areas. Further, the first light emitting element 62 may be configured to emit light toward the scale 61, and the light is reflected by the light-reflecting areas of the scale 61. The first light receiving element 63 may be configured to receive light reflected by the light-reflecting areas. Also in such a configuration, the encoder 60 outputs an encoder signal in accordance with a light amount received by the first light receiving element to the controller 50, and the controller 50 controls moving operations (e.g., a location and a moving speed) of the carriage 41, and ejection timings of the ink from the head 20.

The measuring sensor 70 has a second light emitting element 71 and a second light receiving element 72. The second light emitting element 71 and the second light receiving element 72 are mounted on the carriage 41, and are arranged to face each other with the scale 61 located therebetween. The second light emitting element 71 and the second light receiving element 72 are electrically connected to the controller 50, and the second light emitting element 71 is controlled to be driven by the controller 50. The second light emitting element 71 is, for example, a light emitting diode, and is configured to emit light in the same wavelength band as the first light emitting element 62 toward the scale 61. When the light emitted by the second light emitting element 71 transmits the light-transmitting area of the scale 61 and is incident on the second light receiving element 72, the measuring sensor 70 outputs a signal representing the light amount received by the second light receiving element 72 to the controller 50. The controller 50 performs calculating operations such as calculation of a lifetime of the scale 61 based on the light amount received by the second light receiving element 72. The calculating operation will be described in detail below.

As the encoder 60 according to the present embodiment is of the transmissive type, the transmissive type sensor is employed as the measuring sensor 70 since the scale 61 is for the transmissive type encoder 60. If the encoder 60 is of the reflective type, the reflective type sensor is employed as the measuring sensor 70. The reflective type measuring sensor 70 is configured such that the second light receiving element 72 receives light emitted by the second light emitting element 71 and reflected by the reflective area of the scale 61. Also in such a case, the measuring sensor 70 outputs a signal representing the light amount received by the second light receiving element 72 to the controller 50, and the controller 50 performs the calculating operation to calculate the lifetime of the scale 61 based on the received amount of light.

Printing Operation

The controller 50 performs a printing operation in which the controller 50 controls the nozzles 21 to eject ink droplets based on image data, thereby printing an image on the printing medium A. In this printing operation, the controller 50 performs a pass operation and a conveying operation. In the pass operation, the controller 50 causes the head 20 to eject ink droplets toward the printing medium A, while moving the carriage 41 rightward or leftward based on the encoder signal. In the conveying operation, the controller 50 moves the printing medium A frontward. As described above, the printing apparatus 10 alternately repeats the pass operation and the conveying operation to proceed the printing operation.

Further, at every execution of the printing operation, the controller 50 stores a width of the printing medium A in the right-left direction and the printing amount in the storage device 52 based on the image data. Regarding the printing amount, the controller 50 obtains a printing amount of a current printing operation based on the image data therefor, adds the thus obtained current printing amount to the printing amount accumulated by the previous printing operation, and stores the calculated printing amount in the storage device 52 as the printing amount. The thus obtained printing amount is an amount of image printed by the printing operation. Examples of the printing amount may be represented by the number of sheets of the printing medium A on which images have been printed, the area of the image that has been printed on the printing medium A, or the amount of ink that has been ejected to print the image. When the printing amount is represented by the number of sheets of the printing medium A, a ratio of the area of the image to be printed on the printing medium A of a particular size is defined in advance, and the number of sheets of the printing medium A of a particular size, which is calculated from the area of the printed image based on the ratio, is used as the printing amount. It is noted that the width of the printing medium A may be obtained based on a detection signal of a sensor configured to detect the same.

Measuring Operation

In the printing operation described above, since the ink is ejected from the head 20 with moving the carriage 41, ink mist may float and is adhered to transparent areas of the scale 61. In such a case, the amount of light passing through such areas and received by the encoder 60 may be lowered, and the H-level signal, which should be output at the transparent areas, may not be output by the encoder 60. Therefore, based on the signal output by the encoder 60, the controller 50 moves the carriage 41 and executes a measuring operation in which light is emitted by the second light emitting element 71 to a measuring position on the scale 61 and the light transmitted through the measuring position is received by the second light receiving element 72. When the measuring sensor 70 is of the reflective type, the reflected light from the measuring position is received by the second light receiving element 72.

Concretely, the controller 50 moves the carriage 41 either rightward or leftward based on the encoder signal transmitted by the encoder 60, without ejecting the ink from the head 20. The controller 50 causes the second light emitting element 71 of the measuring sensor 70, which moves in conjunction with the movement of the carriage 41, to emit light to the measuring position on the scale 61. When the light transmitted through the measuring position is received by the second light receiving element 72, the controller 50 obtains the received amount of light from the second light receiving element 72. Since the measuring position corresponds to the location of the carriage 41, the controller 50 obtains the measuring position on the scale 61 based on the encoder signal. Further, since the received light amount decreases as the printing amount increases, the controller 50 obtains the current printing amount from the storage device 52, associates the measuring position, the light amount corresponding to the measuring position, and the printing amount with respect to each other, and stores the same in the storage device 52.

Calculation Operation

By performing the above described measuring operation, received light amounts at one or more measuring positions on the scale 61 are obtained. Then, in the calculating operation, the controller 50 calculates the lifetime of the scale 61 based on the amount of light transmitted through the measuring position and received by the second light receiving element 72. For each measuring position, the controller 50 obtains, from the storage device 52, the received light amount measured in the measuring operation up to the current time and the printing amount at the time of the measuring operation. Then, the controller 50 plots correspondence data showing the correspondence between one or more received light amounts obtained at respective measuring positions and the printing amounts on a graph with the printing amount on the horizontal axis and the received light amount on the vertical axis, as shown in the example in FIG. 3.

Then, the controller 50 fits a fitting function to these correspondence data by using a least square method or the like. The fitting function is a particular curvilinear function, for example, an exponential function expressed as $y = ae^{bx}$. In this exponential function, y represents the amount of received light, x represents the printing volume, e represents the Napier number, and a and b represent parameters. The controller 50 defines the fitting function using the calculated a and b to obtain an expression for the change curve, and calculates x when y matches the threshold value in the change curve expression as a lifetime printing amount (lifetime). This lifetime printing amount is the printing amount when the light amount received by the second light receiving element 72 in the change curve matches a threshold value. That is, the lifetime printing amount is a printing amount printable with using the second light receiving element 72.

This threshold value is set in advance as the received light amount of the second light receiving element 72 when an appropriate encoder signal is output by the encoder 60, for example, when an H-level signal is output by the encoder 60. When there are multiple measuring positions, the controller 50 calculates the change curve indicating the received light amount with respect to the printing amount for each of the multiple measuring positions, and the printing amount at which the received light amount in the change curve matches the threshold value is calculated as the lifetime.

In accordance with the lifetime of the scale 61 calculated as described above, the controller 50 can execute a life-extending process. Examples of the life-extending process include a process of reducing a moving speed of the carriage 41, a process of reducing a rate of change (accelerating/decelerating) of the moving speed of the carriage 41, a process of using a tricolor black ink that is a combination of cyan, yellow, and magenta inks instead of a black ink, a process of using dye ink instead of pigment ink, and a process of changing a print start position between the leftmost and rightmost positions, and a process of outputting (e.g., displaying) a guide text to the output device 16. Examples of the guide text indicate, for example, changing the location of the printing medium A, buying a new printing apparatus 10, and requesting for repair of the printing apparatus 10. Examples of the change in the location of the printing medium A include, for example, rearranging the location of the printing medium A from the center of the platen 11 in the left-right direction to the edge, such that an edge of the printing medium A avoids a position where the receiving light amount of the scale 61 is low.

The controller 50 performs an output operation in which the controller 50 outputs information indicating options for a lifetime extending process to the output device 16 when the remaining lifetime is less than a particular printing amount. It is noted that the remaining lifetime is a difference between the lifetime printing amount (lifetime) and the current printing amount (i.e., a value that the current printing amount is subtracted from the lifetime printing amount). If there are multiple lifetime printing amounts for multiple measuring positions, a shortest lifetime which is the lifetime with the lowest printing amount out of the multiple lifetime printing amounts may be used. The controller 50 outputs the lifetime and the current printing amount, the remaining lifetime, or information indicating that the remaining lifetime is low, along with the options, to the output device 16. The controller 50 may determine whether the calculated lifetime of the scale 61 is shorter than the particular lifetime, and when the calculated lifetime is shorter than the particular lifetime, the output operation may be performed.

The user selects an option of the lifetime extending process based on the above information, and inputs the option of the lifetime extending process in the controller 50 through the input device 15. When the input option is lowering of the moving speed of the carriage 41 or lowering of a changing rate of the moving speed of the carriage 41, the controller 50 controls the moving motor 44 in accordance with the option. When the input option is changing of the ink, the controller 50 drives the driving elements 22 in accordance with the selection. Further, when the input option is a guidance text, a changing of a location of the printing medium A and fixing of the printing apparatus 10 are performed by the user according to the guidance text. In this way, the lifetime of the scale 61 is extended, deterioration in the detection accuracy of the encoder 60 is suppressed, and the shortening of the lifetime of the printing apparatus 10 caused by the deterioration in the detection accuracy of the encoder 60 is suppressed.

Execution Timing of Measurement Operation

As described above, the calculation of the lifetime of the scale 61 is based on the received light amount during the measuring operation, but since the measuring operation takes time, the calculation of the lifetime of the scale 61 takes time if the measuring operation is performed each time the lifetime of scale 61 is calculated. Therefore, the measuring operations may be performed at a frequency corresponding to the printing amount. That is, the measuring operations are performed such that the higher the measurement frequency is, the smaller the printing amount in the interval between successive measuring operations and the greater the number of measuring operations performed for each particular width of printing amount.

Figure 3:
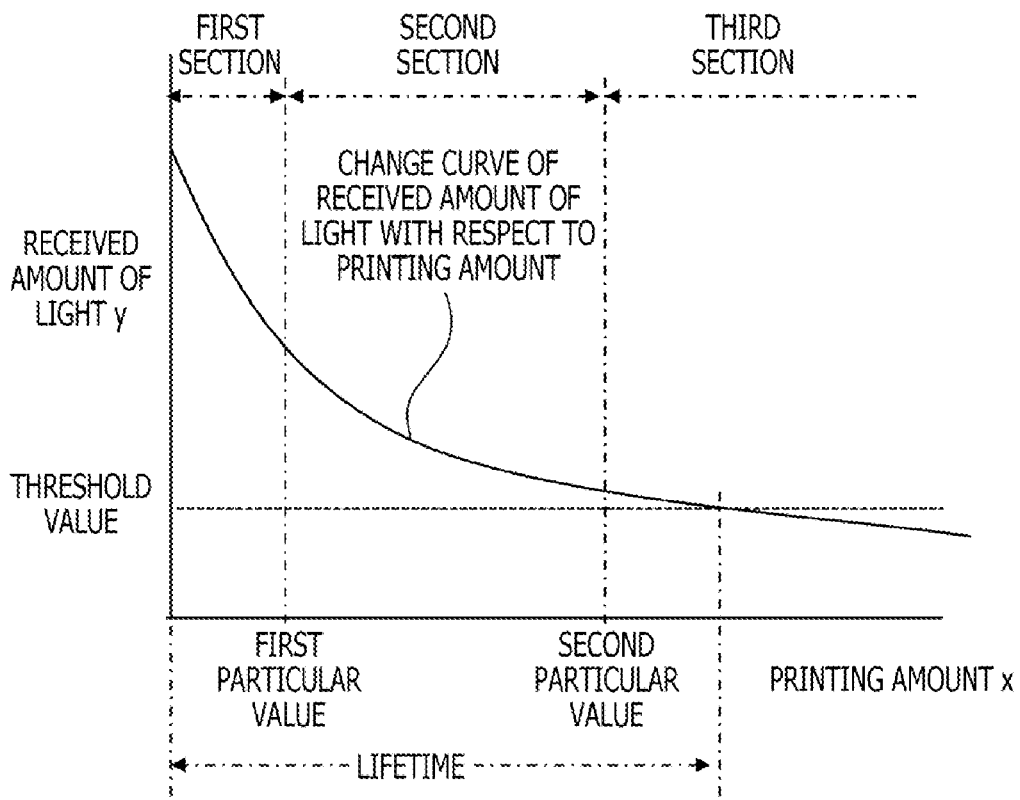
FIG. 3 is a graph showing a relationship between an amount of received light and an amount of printing.

The graph in FIG. 3 shows a first section in which the printing amount is less than a first particular amount, a second section in which the printing amount is greater than or equal to a first particular amount and less than a second particular amount that is greater than the first particular amount, and a third section in which the printing amount is greater than or equal to the second particular amount. If the particular lifetime printing amount is 100%, the first particular amount is 20%, and the second particular amount is 80%. In the above example, the graph of the printing amount has three sections, but the number of these sections may be more than three.

The inclination in the change curve indicating the received light amount with respect to the printing amount is greater in the first section than in the second and third sections. Therefore, regarding the execution frequency of the measuring operations, the first frequency of the first section is higher than the second frequency of the second section and the third frequency of the third section. Furthermore, since the remaining lifetime of the third section is relatively long, it is preferable that the lifetime of the third section be calculated more accurately. Therefore, the inclination of the change curve is smaller in the third section than in the second section, but the third frequency may be higher than the second frequency and even higher than the first frequency. Thus, by executing the measuring operations in accordance with the frequency according to the printing amount, the accuracy of the lifetime and the reduction of calculation efforts can be balanced.

Excluding Operation

Although the execution frequency of the measuring operations may be adjusted according to the printing amount as described above, the number of measuring operations may be adjusted by excluding a target measuring position for the measuring operations (i.e., a subject of the measuring operation) by an excluding operation. In the printing operation, ink is ejected from the head 20 while the carriage 41 reciprocates in the right-left direction. When the carriage 41 reverses its moving direction to the right or left, wind is generated, and this wind causes ink mist to float in the air. In addition, by the wind that is generated when the carriage 41 reverses and is reflected off the inner surface of the casing 13, ink mist is also floated in the air. This results in a greater amount of ink adhering to the scale 61 at end portions than in a central portion within the moving range of the carriage 41. Therefore, positions of the scale 61 corresponding to the end portion of the movement range of the carriage 41 where the amount of ink adhesion is greater are the target measuring positions for the measuring operation.

Since the travel range of the carriage 41 corresponds to the width of the printing medium A in the right-left direction, the correspondence between widths of the printing medium A and the measuring positions are stored in advance in the storage device 52 as a particular positional correspondence. The controller 50 stores the measuring positions corresponding to the respective widths of a plurality of printing media A to be printed in the printing operation in the storage device 52 as a subject of the measuring operations based on this particular positional correspondence. It is noted that the amount of ink adhesion on the scale 61 may vary depending on the printing area and density of the image on the printing medium A, in addition to the width of the printing medium A. In such a case, the controller 50 may store, in the storage device 52, a measuring position based on image data for printing an image as a subject of the measuring operation. The width of the printing medium A, printing rate (print duty), resolution, and the number of dots based on the image data, and the size of the ejected ink droplets are stored in advance in the storage device 52 in correspondence with a measuring position.

When the width of the printing medium A subject to be printed in the printing operation is changed, the measuring position of the measuring operation is changed accordingly, and the lifetime is calculated for each of multiple measuring positions. The lifetime at the measuring position is longer when the amount of printing on the printing media A of the width corresponding to the measuring position is small. If the measuring operation is executed to such a measuring position, it takes time to calculate the lifetime based on the multiple measuring operations. Therefore, the controller 50 performs an excluding operation to exclude, among the lifetimes for the plurality of measuring positions, some of the plurality of measuring positions from the measuring operations based on the result of comparing the shortest lifetime with other lifetimes other than the shortest lifetime.

For example, the plurality of measuring positions include, for example, a first measuring position and a second measuring position that is different from the first measuring position. In such a case, in the calculating operation, the controller 50 obtains, from the storage device 52, the received amount of light from the second light receiving element 72 in the measuring operation executed up to now for the first measuring position of the scale 61, as well as the printing amount at the time of the first measuring operation. Then, the controller 50 plots one or more pieces of the obtained data representing the correspondence between the received light amount and the printing amount on the graph shown in FIG. 4, performs curve fitting on this correspondence data to calculate an approximate curve as the first change curve, and calculates the printing amount when the received light amount on the first change curve matches the threshold value as a first lifetime printing amount. That is, the first lifetime printing amount is a printing amount where the light amount received by the second light receiving element 72 in the first change curve matches the threshold value.

For the second measuring position on the scale 61, as with the first measuring position, the controller 50 obtains the data representing the correspondence between the received light amount and the printing amount from the storage device 52, performs the curve fitting on this correspondence data to calculate the second change curve, and calculates the printing amount when the received light amount on the second change curve matches the threshold as a second lifetime printing amount. That is, the second lifetime printing amount is a printing amount where the light amount received by the second light receiving element 72 in the second change curve matches the threshold value. In the example shown in FIG. 4, the first lifetime printing amount is less than the second lifetime printing amount, e.g., the first lifetime printing amount corresponds to the shortest lifetime with the lowest printing amount among the multiple lifetime printing amounts.

Figure 4:
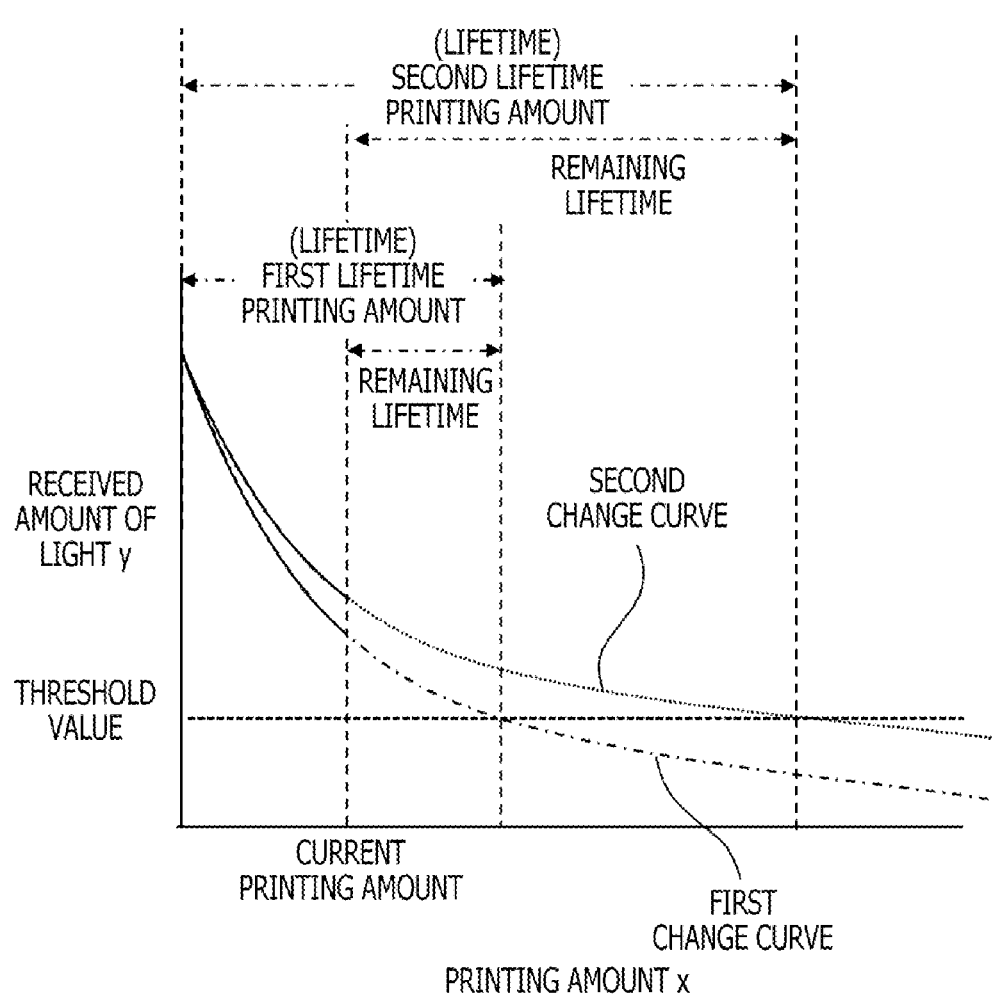
FIG. 4 is a graph showing a first change curve at a first measuring position and a second change curve at a second measuring position.

In the excluding operation, the controller 50 obtains the first lifetime printing amount as the shortest lifetime from among the plurality of lifetime printing amounts, and obtains the second lifetime printing amount as another lifetime other than the shortest lifetime from among the plurality of lifetime printing amounts in the example in FIG. 4. The controller 50 then calculates a quotient of the second lifetime printing amount divided by the first lifetime printing amount as the ratio of the second lifetime printing amount to the first lifetime printing amount. When the ratio of this lifetime printing amount is greater than or equal to the first particular value, the controller 50 excludes the count value (e.g., 0 to 2000) of the encoder signal corresponding to the second measuring position from the storage device 52 because the second lifetime printing amount is far from the first lifetime printing amount, thereby excluding the second measuring position is excluded from subject of the measuring operation. On the other hand, if the ratio of lifetime printing amount is less than the first particular value, the controller 50 leaves the second measuring position stored in the storage device 52 as the subject of the measuring operation since the second lifetime printing amount may be the shortest lifetime.

Figure 5A:
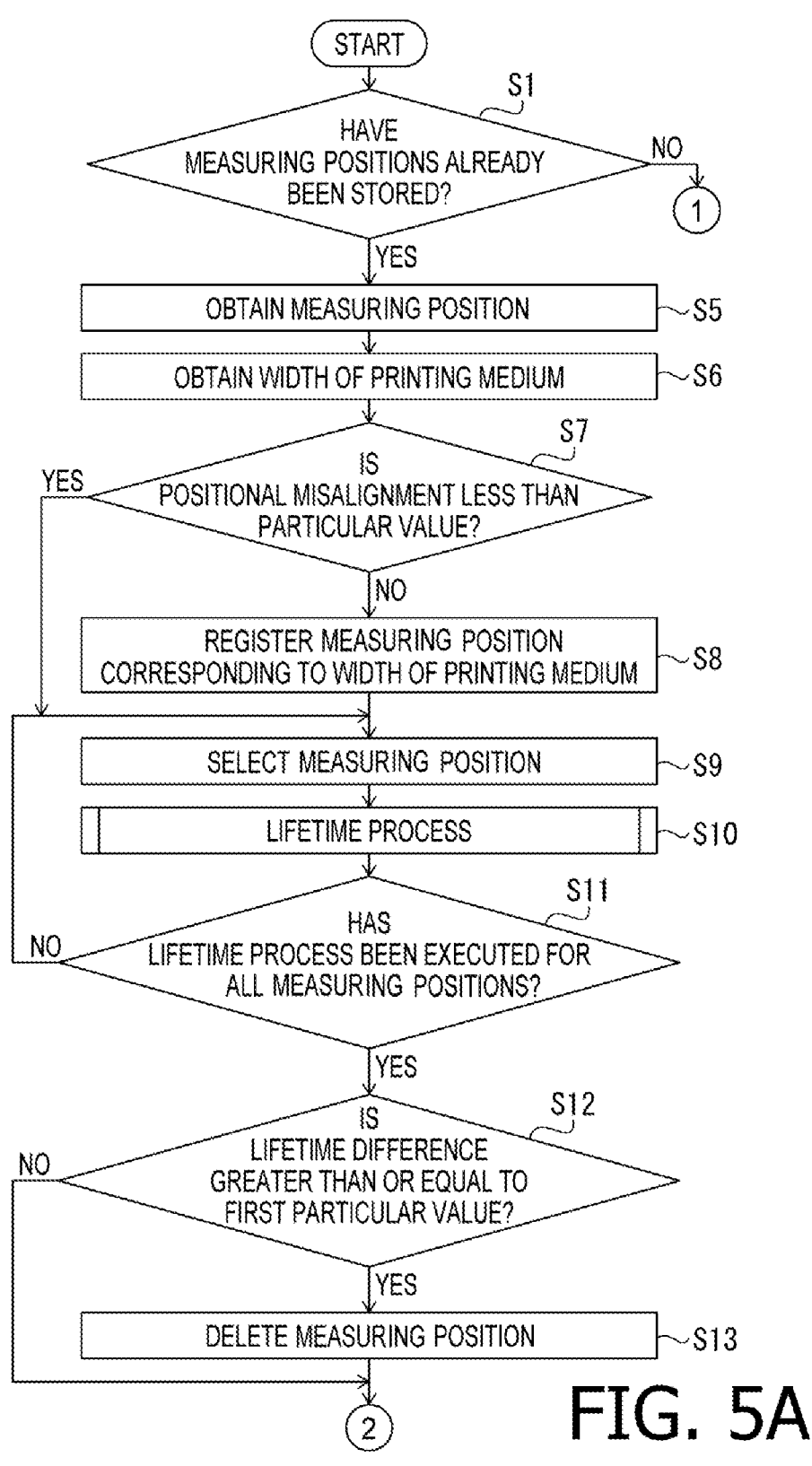
FIGS. 5A and 5B are a flowchart illustrating a control method of the printing apparatus.
Figure 5B:
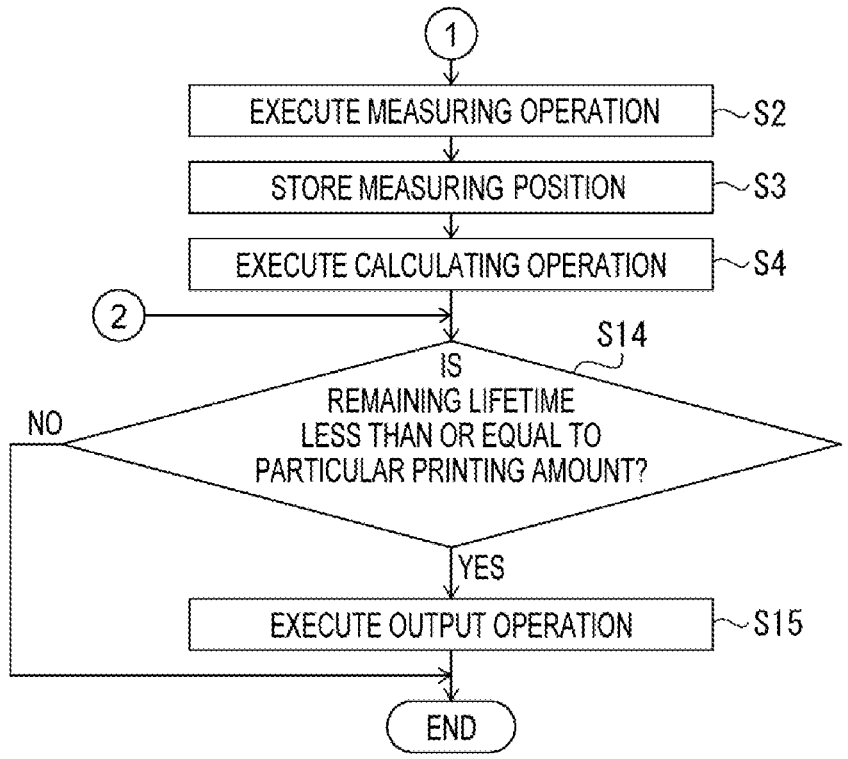

A control method for the printing apparatus 10 is performed by the controller 50, for example, according to a flowchart shown in FIGS. 5A and 5B. This control method is performed at particular timings other than during the printing operation. The controller 50 determines whether the measuring positions for the scale 61 have already been stored in the storage device 52 as the subjects of the measuring operation (S1). When no measuring position is registered (S1: NO), the controller 50 executes S2. When the measuring positions are registered (S1: YES), the controller 50 executes S5.

In S2, the controller 50 performs the measuring operation. If no printing operation has been performed up to this time, the controller 50 determines a particular initial position as the measuring position. On the other hand, if a printing operation has been executed up to the current time, the controller 50 obtains, from the storage device 52, the width and print volume of the printing medium A, which is subject to the printing operation executed up to the current time, and determines the measuring position according to the width of the printing medium A. Then, the controller 50, while moving the carriage 41 based on the encoder signal, causes the second light emitting element 71 to emit light to the determined measuring position, and the light passing through the measuring position is received by the second light receiving element 72 to obtain the received light amount.

Then, the controller 50 stores the measuring position at which the measurement is performed in the measuring operation, in the storage device 52, in association with the received light amount received by the second light receiving element 72 and the printing amount at the current time (S3).

Then, the controller 50 execute a calculating operation to calculate the lifetime of the scale 61 based on the received light amount of the second light receiving element 72 in the measuring operation (S4). In this measuring operation, the controller 50 obtains the measuring position in the measuring operation, the light receiving amount and the printing amount thereat from the storage device 52, and adjusts a fitting function (e.g., $y=ae^{bx}$) to the data corresponding to the printing amount and the light receiving amount. The controller 50 then calculates the printing amount at which the light receiving amount matches a threshold value in the change curve obtained by this curve fitting as the lifetime of the scale 61.

Further, in S5, the controller 50 obtains, from the storage device 52, one or more measuring positions that have already been registered as the subjects of the measuring operation. The controller 50 then obtains the width of the printing medium A subjected to be printed by the printing operation from the storage device 52 (S6).

The controller 50 calculates the absolute value of the difference obtained by subtracting the measuring position corresponding to the width of the printing medium A obtained in S6 from the measuring position obtained in S5 as a positional deviation. The controller 50 then determines whether the positional misalignment is less than a particular value (S7). When the positional misalignment is greater than or equal to a particular value (S7: NO), the measuring position corresponding to the width of the printing medium A is registered as subject to the measuring operation (S8).

When the positional misalignment is less than a particular value (S7: YES), or when the measuring position corresponding to the width of the printing medium A is registered at S8, the controller 50 selects one measuring position from one or more measuring positions that are registered as the subjects of the measuring operation (S9). Then, the controller 50 performs a lifetime process to obtain the lifetime at the selected measuring position (S10).

Figure 6:
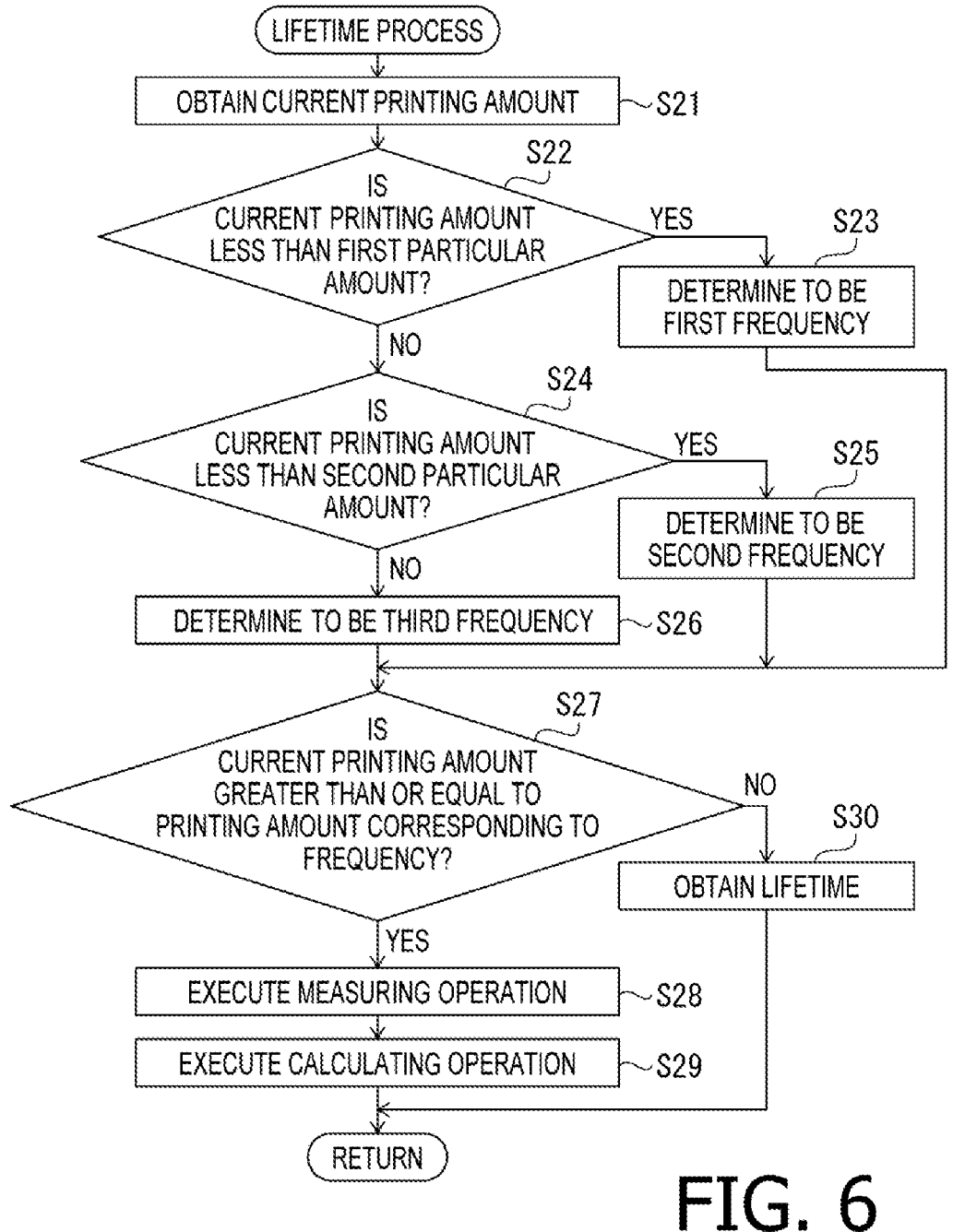
FIG. 6 is a flowchart illustrating a lifetime process.

The lifetime process is performed by the controller 50 according to the flowchart shown in FIG. 6. First, the controller 50 obtains the current printing amount from the storage device 52 (S21). Next, the controller 50 determines whether the current printing amount is less than a first particular amount (S22). When the current printing amount is less than the first particular amount (S22: YES), the controller 50 determines a frequency of the measuring operation to be a first frequency (S23), because the current printing amount is in the first section.

When the current printing amount is greater than or equal to the first particular amount (S22: NO), the controller 50 determines whether the current printing amount is less than the second particular amount (S24). When the current printing amount is less than the second particular amount (S24: YES), which means the current printing amount is in the second section, the controller 50 determines that the execution frequency of the measuring operation is to be a second frequency (S25). When the current printing amount is greater than or equal to the second particular amount (S22: NO), which means the current printing amount is in the third section, the controller 50 determines the execution frequency to the measuring operation is to be a third frequency (S26).

The controller 50 then calculates the printing amount to perform the measuring operation according to the frequency, for example, by adding the printing amount corresponding to the determined execution frequency to the printing amount at the time of the previous measuring operation. Then, the controller 50 determines whether or not the current printing amount is greater than or equal to the calculated frequency (S27). When the current printing amount is greater than or equal to the printing amount corresponding to the frequency (S27: YES), the controller executes the measuring operation at the measuring position selected in S9 of FIG. 5A (S28), and stores the measuring position, the light amount received by the second light receiving element 72 and the current printing amount in the storage device 52 in an associated manner.

The controller 50 performs the curve fitting on this correspondence data between the printing amount and the received light amount to calculate an equation for the change curve indicating the light amount with respect to the printing amount. Then, the controller 50 calculates the printing amount when the received light amount in this change curve matches the threshold value as the lifetime printing amount of the measuring position (S29), and stores the lifetime in the storage device 52 by associating the lifetime with the measuring position.

In contrast, when the current printing amount is less than the printing amount according to the frequency (S27: NO), the controller 50 obtains the lifetime calculated in the previous calculating operation in S4 or S28 from the storage device (S30). As described above, when the current printing amount does not correspond to the printing amount according to the frequency, the previously calculated lifetime can be used without performing the measuring operation to balance the accuracy of the lifetime and the reduction of the calculation load.

When obtaining the lifetime at the measuring position in S29 or S30, the controller 50 returns to the process of S10 in FIG. 5A. Then, the controller 50 determines whether or not the lifetime process in S10 has been executed for all of the measuring positions registered as subjects of the measuring operation (S11). When there are measuring positions registered as subjects for the measuring operation for which the lifetime process has not been executed (S11: NO), the controller 50 returns to S9, selects one of the measuring positions for which the lifetime process has not been executed, and executes the lifetime process (S10).

On the other hand, when the lifetime process is executed for all of the measuring positions registered as subjects of the measuring operation (S11: YES), the controller 50 executes the excluding operation. In the excluding operation, the controller 50 calculates the shortest lifetime and other lifetimes from the lifetimes at all the measuring positions on the scale 61, and then calculates differences by subtracting the shortest lifetime from the other lifetime. In the example shown in FIG. 4, the first lifetime printing amount is the shortest lifetime, the second lifetime printing amount is the other lifetime, and the difference by subtracting the first lifetime printing amount from the second lifetime printing amount is calculated as a lifetime difference. The controller 50 then determines whether or not the difference in lifetime is greater than or equal to the first particular value (S12).

When the difference in lifetime is less than the first particular value (S12: NO), the second lifetime printing amount is close to the first lifetime printing amount and may be the shortest lifetime. Therefore, the controller 50 does not delete the second measuring position of the second lifetime printing amount from the storage device 52, but keeps the second measuring position registered as the subject of the measuring operation and stored in the storage device 52. On the other hand, when the lifetime difference is greater than the first particular value (S12: YES), the second lifetime printing amount is far from the first lifetime printing amount and there is no or low possibility that the second lifetime printing amount is the shortest lifetime. In such a case, the controller 50 deletes the second measuring position from the storage device 52 to exclude the second measuring position from the measuring operation (S13). In this way, the number of measuring positions subjected to the calculation in the next execution of S5 is reduced, and the number of measuring positions subjected to the measuring operation in S28 that is executed in S10 is reduced. Therefore, it is possible to balance between the accuracy of the lifetime of the 61 scale based on the measuring operation and the reduction of the computational load.

Next, the controller 50 calculates a remaining lifetime, which is the difference calculated by subtracting the current printing amount from the lifetime printing amount calculated in the lifetime process in S10 or the calculating operation in S4, and determines whether or not the remaining lifetime is less than or equal to a particular printing amount (S14). When the remaining lifetime is greater than the particular printing amount (S14: NO), the controller 50 terminates the process since the lifetime extending process of the scale 61 does not need to be performed. On the other hand, when the remaining lifetime is less than the particular printing amount (S14: YES), the controller 50 executes the output operation (S15).

In the output operation, the controller 50 outputs an option indicating the lifetime extending process to the output device 16, along with the remaining lifetime and other information. In this way, the user can perform the lifetime extending process of the scale 61 according to the lifetime of the scale 61. Therefore, deterioration in the detection accuracy of the encoder 60 equipped with the scale 61 can be suppressed, and the shortening of service lifetime of the printing apparatus 10 caused by the deterioration in the detection accuracy can be suppressed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the printing apparatus 10 according to a modification of the embodiment of the present application, the controller 50 calculates, in the calculating operation, a third change curve indicating the light amount received by the second light receiving element 72 with respect to the printing amount of an image for a third measuring position among the multiple measuring positions, and calculates a fourth change curve indicating the light amount received by the second light receiving element 72 with respect to the a printing mount of an image for a fourth measuring position among the multiple measuring positions. The controller 50 also calculates a third lifetime printing amount at which the light amount received by the second light receiving element 72 in the third change curve matches a threshold value, and calculates a fourth lifetime printing amount at which the light amount received by the second light receiving element 72 in the fourth change curve matches the threshold value. In the excluding operation, when the third lifetime printing amount is less than the fourth lifetime printing amount, the controller 50 calculates a ratio of the slope of the tangent line in the current printing amount in the fourth change curve to the slope of the tangent line in the current printing amount in the third change curve, and when the ratio of the slope is less than a second particular value, the fourth measuring position is excluded from subjects of the measuring operation.

Figure 7A:
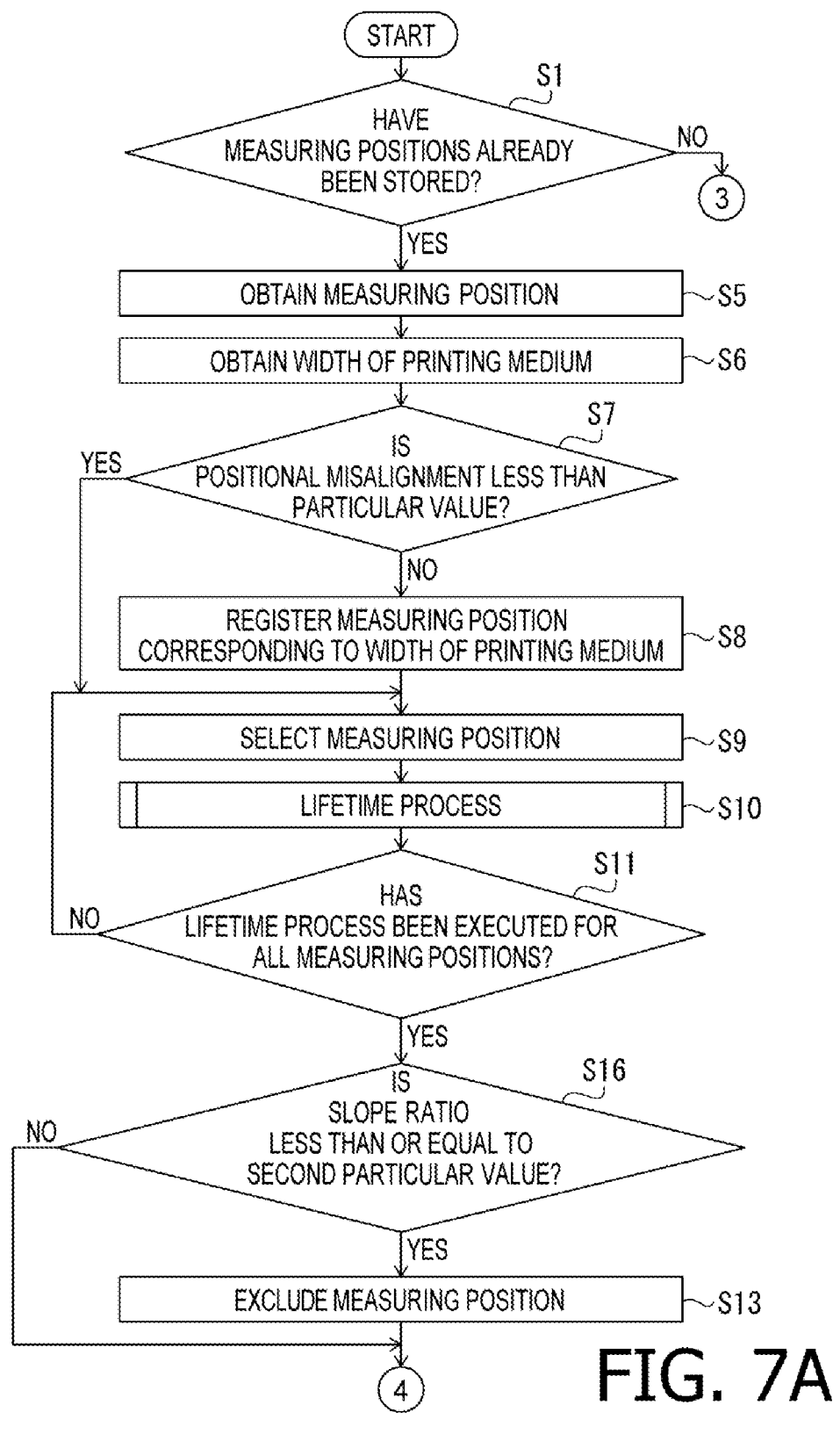
FIGS. 7A and 7B are a flowchart illustrating a control method of the printing apparatus.
Figure 7B:
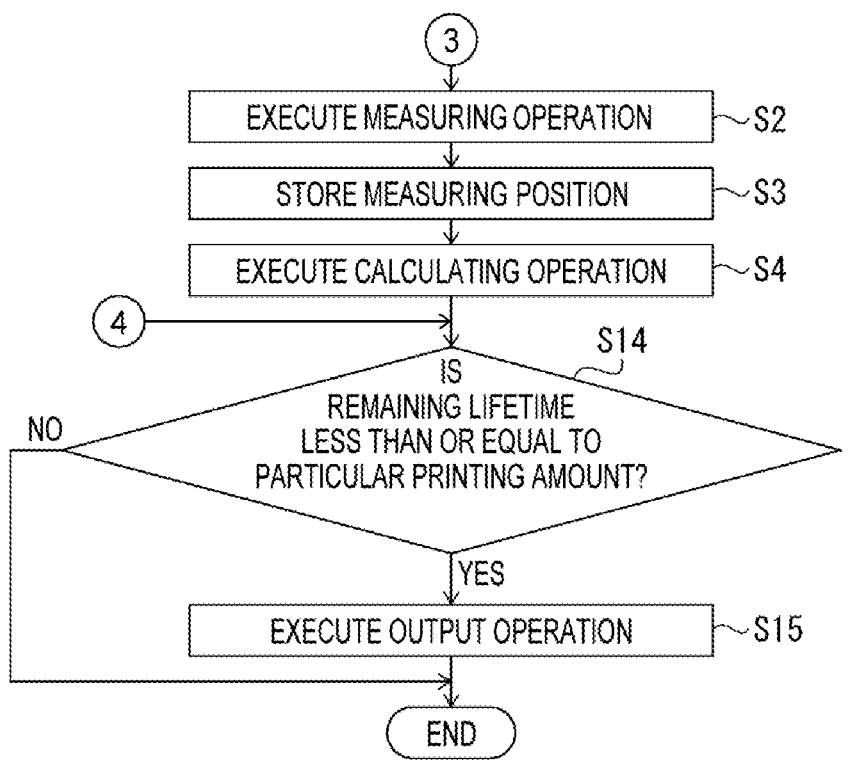

For example, a control method of the printing apparatus 10 according to this modification of the embodiment 1 is performed by the controller 50 according to the flowchart shown in FIGS. 7A and 7B. In this flowchart of FIGS. 7A and 7B, instead of the process of S12 in the flowchart of FIG. 5A, the process of S16 is performed. Other than this process, the processes of FIGS. 7A and 7B are similar to the processes of FIGS. 5A and 5B. It noted that the measuring positions of the scale 61 and their change curves in FIGS. 7A and 7B and FIGS. 5A and 5B differ in their ordinal numbers for convenience of explanation, but the processes are not limited by the order according to this ordinal number.

Figure 8:
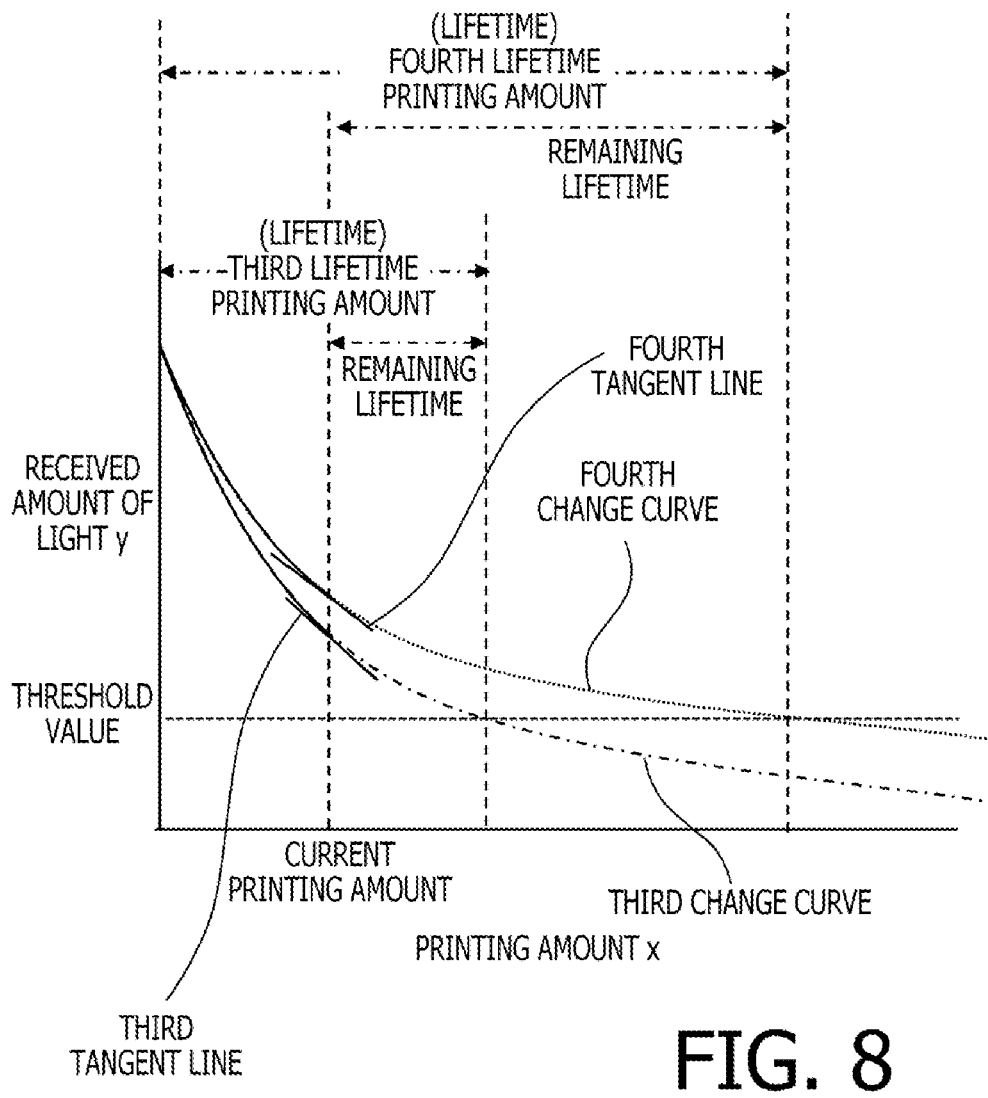
FIG. 8 is a graph showing a third change curve at a third measuring position, and a fourth change curve at a fourth measuring position.

In the calculating operation of S29 of FIG. 6 in this lifetime process of S10 of FIG. 7A, the controller 50 obtains, for the third measuring position of the scale 61, the light amount received by the second light receiving element 72 by the measuring operation executed so far and the amount of printing at the time of that measuring operation from the storage device 52 The storage device 52 acquires the data from the storage device 52. The controller 50 plots the acquired correspondence data between one or more received light amounts and the printing amount on the graph shown in the example in FIG. 8, executes curve fitting on this correspondence data, calculates an approximate curve as the third change curve, and calculates the printing amount when the received light amount of the third change curve matches the threshold value as the third lifetime printing amount (lifetime) is calculated as the third lifetime printing amount. For the fourth measuring position, which is different from the third measuring position on the scale 61, in the same way as the third measuring position, the data corresponding to the received light amount and the printing amount is acquired from the storage device 52, curve fitting is performed on this corresponding data and the fourth change curve is calculated. The printing amount when the received light amount of the fourth change curve matches the threshold value is calculated as the fourth lifetime printing amount (lifetime). In the example of FIG. 8, the third lifetime printing amount is less than the fourth lifetime printing amount, e.g. the shortest lifetime with the lowest printing amount among multiple lifetime print amounts.

In the excluding operation of S16 in FIG. 7A, the controller 50 obtains the third lifetime printing amount as the shortest lifetime from the plurality of lifetime print amounts in the example of FIG. 8, and obtains the fourth lifetime printing amount as another lifetime other than the shortest lifetime from the plurality of lifetime print amounts. The controller 50 then calculates the third tangent of the third change curve at the current printing amount and the slope of the third tangent, and the fourth tangent of the fourth change curve at the current printing amount and the slope of the fourth tangent. The controller 50 then calculates the quotient of the slope of the fourth tangent line divided by the slope of the third tangent line as the ratio of the slope of the fourth tangent line to the slope of the third tangent line.

The controller 50 then determines whether the ratio of the slope is less than or equal to the second particular value. When the ratio of the slope is less than or equal to the second particular value (S16: YES), the controller 50 excludes the fourth measuring position from the subject of the measuring operation by excluding the fourth measuring position from the storage device 52 because the fourth lifetime printing amount is not likely or not to deviate from the third lifetime printing amount and become the shortest lifetime (S13). On the other hand, when the slope ratio is greater than the second particular value (S16: NO), the controller 50 maintains the fourth measuring position stored in the storage device 52 as the subject of the measuring operation because the fourth lifetime printing amount may be the shortest lifetime. Thus, by excluding or maintaining the measuring position in the object of the measuring operation, the accuracy of calculation of the lifetime of the scale 61 can be reduced and effort of the measuring operation can be reduced.

In the printing apparatus 10 according to another modification of the above embodiment of the present application, in the calculating operation, the controller 50 calculates, in the calculating operation, a fifth change curve indicating the light amount received by the second light receiving element 72 with respect to the printing amount of an image for a sixth measuring position among the multiple measuring positions, and calculates a fourth change curve indicating the light amount received by the second light receiving element 72 with respect to the a printing mount of an image for a fourth measuring position among the multiple measuring positions. The controller 50 also calculates a fifth lifetime printing amount at which the light amount received by the second light receiving element 72 in the fifth change curve matches a threshold value, and calculates a sixth lifetime printing amount at which the light amount received by the second light receiving element 72 in the sixth change curve matches the threshold value. In the excluding operation, when the fifth lifetime printing amount is less than the sixth lifetime printing amount, the controller 50 calculates the coefficient b of a formula for the fifth change curve, where the printing amount is x, the light amount received by the second light receiving element 72 is y and the formula for the fifth change curve is $y=ae^{bx}$. Further, the controller 50 calculates a correction coefficient b of a correction formula the fifth change curve, where the printing amount is x, the light amount received by the second light receiving element 72 is y and the formula for the fifth change curve is $y=ae^{bx}$, and when a corrected formula for the sixth change curve is $y=ae^{bx}+c$ in a case where the sixth change curve is corrected from a current printing amount in such a manner that the printing amount matches the fifth lifetime printing amount. Additionally, the controller 50 calculates a ratio of the correction coefficient b with respect to the coefficient b, and excludes the sixth measuring position from subjects of the measuring operation when the ratio of the correction coefficient b is greater than or equal to a third particular value.

Figure 9A:
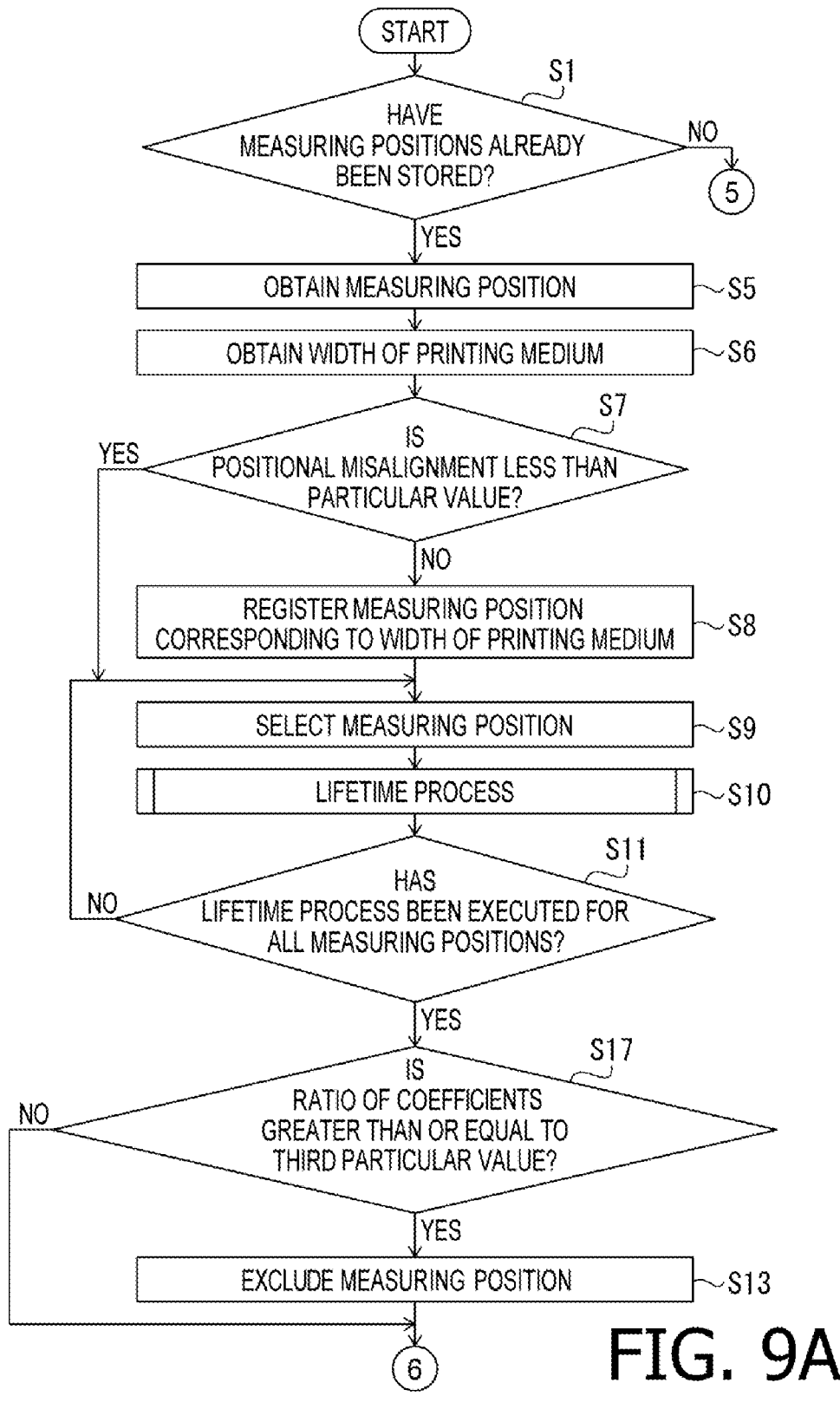
FIGS. 9A and 9B are a flowchart illustrating a control method of a printing apparatus.
Figure 9B:
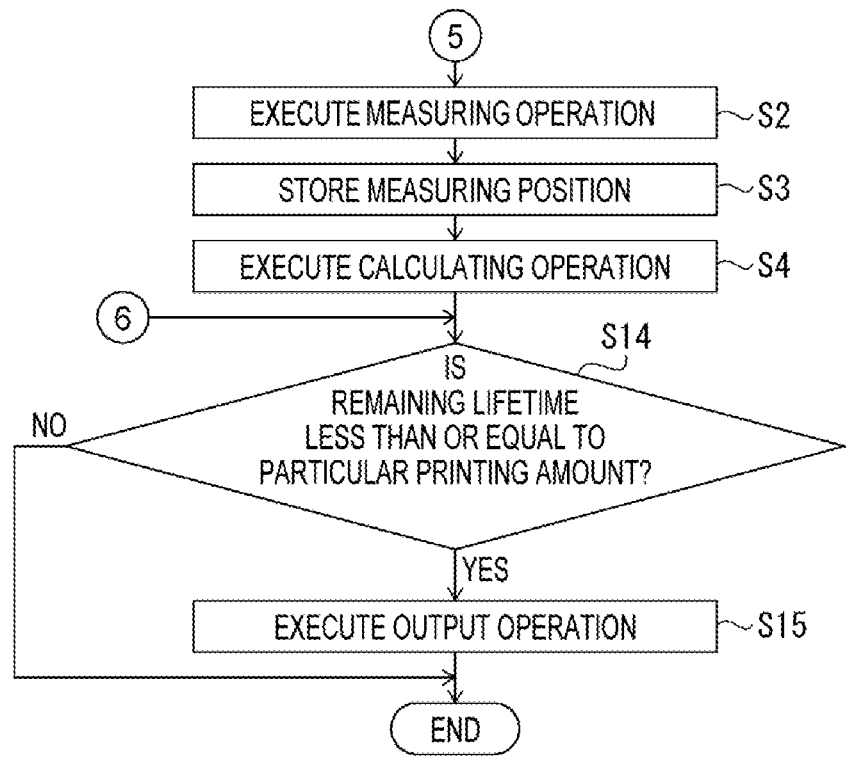

For example, a control method of the printing apparatus 10 according to this modification of the embodiment 1 is performed by the controller 50 according to the flowchart shown in FIGS. 9A and 9B. In this flowchart of FIGS. 9A and 9B, instead of the process of S12 in the flowchart of FIG. 5A, the process of S17 is performed. Other than this process, the processes of FIGS. 9A and 9B are similar to the processes of FIGS. 5A and 5B. It noted that the measuring positions of the scale 61 and their change curves in FIGS. 9A and 9B and FIGS. 5A and 5B differ in their ordinal numbers for convenience of explanation, but the processes are not limited by the order according to this ordinal number.

Figure 10:
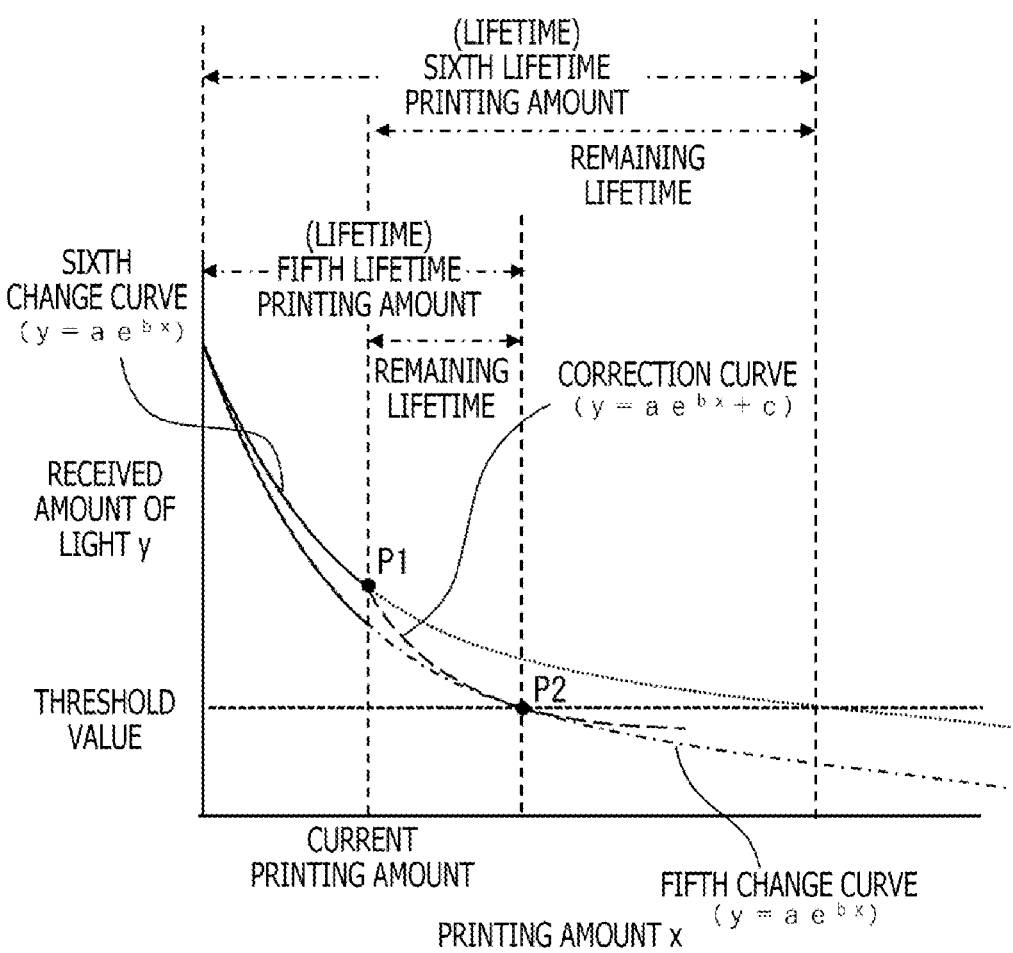
FIG. 10 is a graph showing a fifth change curve at a fifth measuring position, and a sixth change curve at a sixth measuring position.

In the calculating operation of S29 of FIG. 6 in this lifetime process of S10 of FIG. 9A, the controller 50 obtains, for the fifth measuring position of the scale 61, the light amount received by the second light receiving element 72 by the measuring operation executed so far and the amount of printing at the time of that measuring operation from the storage device 52 The storage device 52 acquires the data from the storage device 52. The controller 50 plots the acquired correspondence data between one or more received light amounts and the printing amount on the graph shown in the example in FIG. 10, executes curve fitting on this correspondence data, calculates an approximate curve as the fifth change curve, and calculates the printing amount when the received light amount of the third change curve matches the threshold value as the fifth lifetime printing amount (i.e., lifetime) is calculated as the fifth lifetime printing amount. For the sixth measuring position, which is different from the third measuring position on the scale 61, in the same way as the sixth measuring position, the data corresponding to the received light amount and the printing amount is acquired from the storage device 52, curve fitting is performed on this corresponding data and the sixth change curve is calculated. The printing amount when the received light amount of the sixth change curve matches the threshold value is calculated as the sixth lifetime printing amount (i.e., lifetime). In the example of FIG. 10, the fifth lifetime printing amount is less than the sixth lifetime printing amount, e.g. the shortest lifetime with the lowest printing amount among multiple lifetime print amounts.

In the excluding operation of S17 in FIG. 9A, the controller 50 obtains the fifth lifetime printing amount as the shortest lifetime from the multiple lifetime printing amounts in the example shown FIG. 10 and obtains the sixth lifetime printing amount as the other lifetime other than the shortest lifetime from the plurality of lifetime printing amounts. In this graph of FIG. 10, a horizontal axis shows the printing amount x, a vertical axis shows the received light amount y, and the formulas for the fifth and sixth change curves are expressed as $y=ae^{bx}$. In this formulas, e is the Napier number, and a and b are calculated by the curve fitting.

Here, the controller 50 calculates a corrected sixth change curve by correcting the sixth change curve from the current print volume in such a manner that the sixth lifetime printing amount in the sixth change curve matches the fifth lifetime printing amount in the fifth change curve. The correction formula for this correction curve is expressed as $y=ae^{bx}+c$ and is calculated based on the formula for the sixth change curve ($y=ae^{bx}$), the corresponding data between the current printing amount and the light amount received in the sixth change curve in the current printing amount (i.e., point P1), and the corresponding data between the fifth lifetime printing amount and the received light amount corresponding to the threshold value (i.e., point P2).

The controller 50 then calculates a quotient of the correction coefficient b, which is the coefficient b of x in the correction curve formula, divided by the coefficient b of x in the fifth change curve formula, as a ratio of the coefficient of the correction coefficient b with respect to the coefficient b. The controller 50 then determines whether the ratio of the coefficients is greater than or equal to a third particular value (S17). Here, when the ratio of the coefficients is greater than the third particular value (S17: YES), the controller 50 excludes the sixth measuring position from the storage device 52 by excluding the sixth measuring position from the storage device 52, because the sixth lifetime printing amount is not likely or unlikely to be the shortest lifetime which is the fifth lifetime printing amount is excluded from the measuring operation (S13). On the other hand, if the percentage of the coefficient is less than the third particular value (S17: NO), the controller 50 leaves the sixth measuring position stored in the storage device 52 as the object of the measuring operation, because the sixth lifetime printing amount may be the shortest lifetime. Thus, by excluding or maintaining the measuring position in the object of the measuring operation, the accuracy of the lifetime of the scale 61 can be reduced and the effort of the measuring operation can be reduced.

Figure 11:
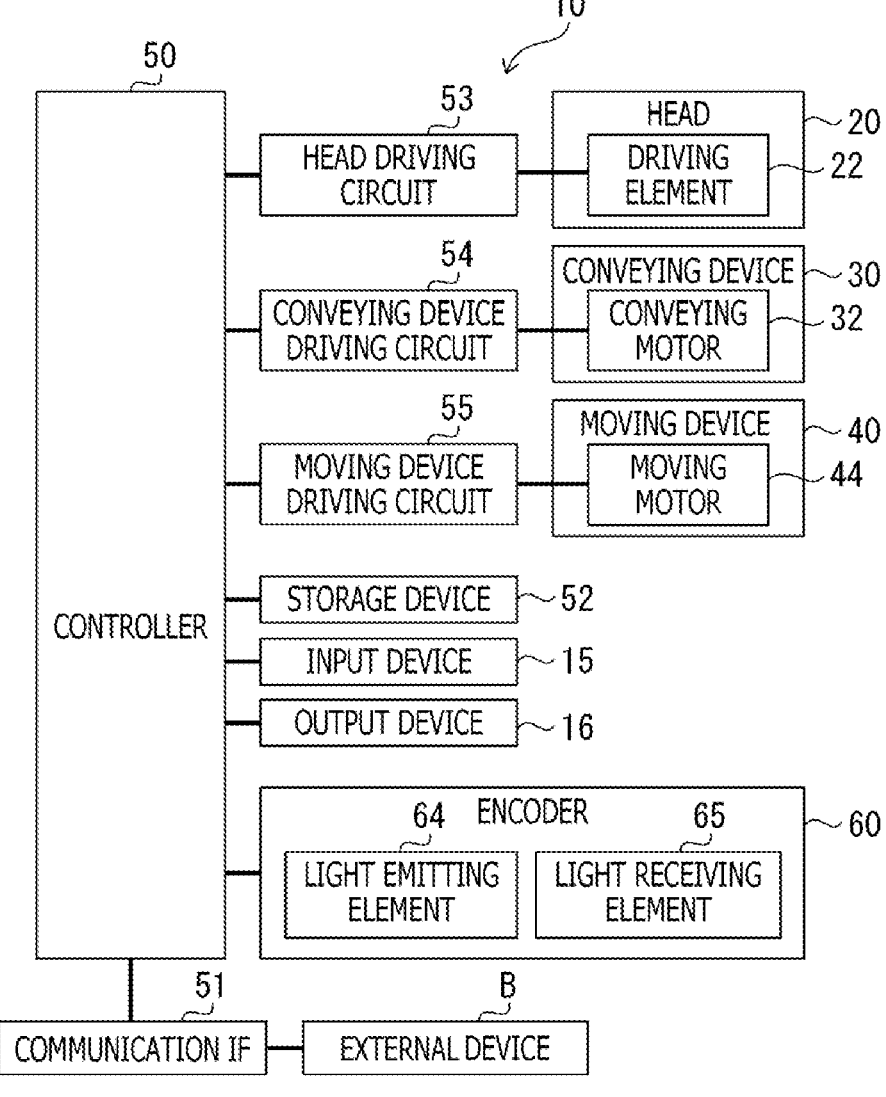
FIG. 11 is a block diagram showing a functional configuration of a printing apparatus.

The printing apparatus 10 according to the above embodiment and modifications include the encoder 60 and the measuring sensor 70 as shown in FIG. 2, but the printing apparatus 10 according to another modification of the embodiment may include the encoder 60 without the measuring sensor 70 as shown in FIG. 11. In this case, the encoder 60 is also used as the measuring sensor 70.

The encoder 60 has the scale 61 (FIG. 1), a light emitting element 64 and a light receiving element 65. The light emitting element 64 is similar to the first light emitting element 62 and the light receiving element 65 is similar to the first light receiving element 63. The light emitting element 64 and the light receiving element 65 are mounted on the carriage 41 (FIG. 1) and are arranged in the front-back direction with the scale 61 between each other and facing each other through the scale 61. The light emitting element 64 and the light receiving element 65 are electrically connected to the controller 50 and the driving of the light emitting element 64 is controlled by the controller 50. The light emitting element 64 is, for example, a light emitting diode and configured to emit light towards the scale 61.

When the light emitted from the light emitting element 64 passes through the translucent part of the scale 61 and is received by the light receiving element 65, the encoder 60 outputs an encoder signal according to the light amount received by the light receiving element 65 to the controller 50, and the controller 50 controls speed and a position of the carriage 41 and the head 20 based on the encoder signal. The controller 50 controls the speed and position of the carriage 41 and the timing of ink ejection from the head 20 based on the encoder signals. The encoder 60 also outputs the light amount received by the light receiving element 65 to the controller 50, and the controller 50 performs calculating operations such as calculating the lifetime of the scale 61 based on this received light amount. The above mentioned encoder 60 is a transmission type encoder, but a reflection type encoder may also be used. In this case, the light receiving element 65 receives the light reflected at the reflective part of the scale 61 out of the light emitted by the light emitting element 64.

In the measuring operation of S2 in FIGS. 5, 7 and 9 and S28 in FIG. 6, the controller 50 moves the carriage 41 based on the signal output by the encoder 60, causes the light emitting element 64 to irradiate light onto the measuring position of the scale 61 and causes the light receiving element 65 to receive light passing through the measuring position. In the calculating operation of S4 in FIGS. 5, 7 and 9 and S29 in FIG. 6, the controller 50 calculates the lifetime of the scale 61 based on the light amount received by the light receiving element 65 for the measuring position. Then, in the output operation of S15 in FIGS. 5, 7 and 9, the controller 50 outputs the lifetime extending process (lifetime extending process) of the scale 61 to the output device 16.

In this measuring operation, the controller 50 may cause transmitted light from a plurality of measuring positions in the scale 61 to be received by the light receiving element 65. In this case, in the calculating operation, the controller 50 calculates the lifetime expectancy based on the light amount received by the light receiving element 65 for each of the plurality of measuring positions. The controller 50 then performs an excluding operation to exclude part of the measuring positions from the multiple measuring positions from the measuring operation based on the result of comparing the shortest lifetime with other lifetimes other than the shortest lifetime among the lifetimes for the multiple measuring positions.

When the excluding operations in S12 and S13 of FIG. 5A is executed, in the calculating operation in S29 of FIG. 6, the controller 50 calculates a first change curve indicating the light amount received by the light receiving element 65 with respect to the printing amount of an image for the first measuring position among the multiple measuring positions, and calculates a second change curve indicating the light amount received by the light receiving element 65 with respect to the printing amount of an image for the second measuring position among the multiple measuring positions. the second measuring position among the plurality of measuring positions. Further, the controller 50 calculates a first lifetime printing amount at which the light amount received by the light receiving element 65 in the first change curve matches a threshold value, and calculates a second lifetime printing amount at which the light amount received by the light receiving element 65 in the second change curve matches the threshold.

In the excluding operation of FIGS. 5A and 5B, the controller 50 calculates the ratio of the second lifetime printing amount to the first lifetime printing amount when the first lifetime printing amount indicates the shortest lifetime, and determines whether the ratio of this lifetime is greater than the first particular value (S12). If the ratio of the lifetime is more than or equal to the first particular value (S12: YES), the controller 50 excludes the second measuring position from the measuring operation (S13). On the other hand, if the ratio of lifetime is less than the first particular value (S12: NO), the controller 50 does not exclude the second measuring position from the measuring operation, but keeps it as the object of the measuring operation.

When the excluding operations in S16 and S13 of FIG. 7A is performed, in the calculating operation in S29 of FIG. 6, the controller 50 calculates a third change curve indicating the light amount received by the light receiving element 65 with respect to the amount of printing of an image for the third measuring position among the plurality of measuring positions, and calculates a fourth change curve indicating the light amount received by the light receiving element 65 with respect to the amount of printing of an image for the fourth measuring position among the plurality of measuring positions. Further, the controller 50 calculates a third lifetime printing amount at which the light amount received by the light receiving element 65 in the third change curve matches the threshold value, and calculates a fourth lifetime printing amount at which the light amount received by the light receiving element 65 in the fourth change curve matches the threshold value. This third lifetime printing amount is less than the fourth lifetime printing amount, e.g. the shortest lifetime.

In the excluding operation of FIGS. 7A and 7B, the controller 50 calculates the ratio of the slope of a tangent line in the current printing amount of the fourth change curve to the slope of a tangent line in the current printing amount of the third change curve, and determines whether the ratio of the slope is less than or equal to the second particular value (S16). If the ratio of the slope is less than or equal to the second particular value (S16: YES), the controller 50 excludes the fourth measuring position from the measuring operation (S13). On the other hand, if the ratio of the slope is greater than the second particular value (S16: NO), the controller 50 keeps the fourth measuring position without excluding the fourth measuring position from subjects of the measuring operation.

When the excluding operations in S17 and S13 of FIG. 9A is performed, in the calculating operation in S29 of FIG. 6, the controller 50 calculates a fifth change curve indicating the light amount received by the light receiving element 65 with respect to the amount of printing of the image for the fifth measuring position among the plurality of measuring positions, and calculates a sixth change curve indicating the light amount received by the light receiving element 65 with respect to the amount of printing of the image for the sixth measuring position among the plurality of measuring positions. Further, the controller 50 calculates a fifth lifetime printing amount at which the light amount received by the light receiving element 65 in the fifth change curve matches the threshold value, and a sixth lifetime printing amount at which the light amount received by the light receiving element 65 in the sixth change curve matches the threshold value. This fifth lifetime printing amount is less than the sixth lifetime printing amount, e.g. the shortest lifetime.

In the excluding operation of FIGS. 9A and 9B, the controller 50 calculates the coefficient b of a formula for the fifth change curve, where the printing amount is x, the light amount received by the light receiving element 65 is y and the formula for the fifth change curve is $y=ae^{bx}$. Further, the controller 50 calculates a correction coefficient b of a correction formula the fifth change curve, where the printing amount is x, the light amount received by the light receiving element 65 is y and the formula for the fifth change curve is $y=ae^{bx}$, and when a corrected formula for the sixth change curve is $y=ae^{bx}+c$ in a case where the sixth change curve is corrected from a current printing amount in such a manner that the printing amount matches the fifth lifetime printing amount. Additionally, the controller 50 calculates a ratio of the correction coefficient b with respect to the coefficient b. Then, in S17, the controller 50 determines whether the ratio of the coefficients is larger than or equal to the third particular value. If the ratio of the coefficients is larger than or equal to the third particular value (S17: YES), the controller 50 excludes the sixth measuring position from the measuring operation (S13). On the other hand, if the ratio of the coefficients is less than the third particular value (S17: NO), the controller 50 keeps the sixth measuring position without excluding it from subjects of the measuring operation.

From the above description, many improvements and other embodiments of the present disclosure are apparent to those skilled in the art. Accordingly, the above description should be interpreted only as an example and is provided for the purpose of teaching those skilled in the art the best ways to implement the present disclosure. The details of the structure and/or function may be substantially changed without departing from the spirit of the present disclosure.

What is claimed is:

1. A printing apparatus comprising:
   a head configured to eject ink on a recording medium;
   a carriage including the head;
   an encoder including a scale, a first light emitting element and a first light receiving element, the scale being elongated along a moving direction of the carriage, the first light emitting element being mounted on the carriage and configured to emit light toward the scale, the first light receiving element being mounted on the carriage and configured to receive light emitted from the first light emitting element and reflected from or passing through the scale, the encoder being configured to output a signal corresponding to a light amount received by the first light receiving element;
   a measuring sensor including a second light emitting element and a second light receiving element, the second light emitting element being mounted on the carriage and configured to emit light toward the scale, the second light receiving element being mounted on the carriage and configured to receive light emitted from the second light emitting element and reflected from or passing through the scale; and
   a controller configured to perform:
      a printing operation of causing the head to eject ink while moving the carriage based on a signal output by the encoder;
      a measuring operation of moving the carriage based on a signal output by the encoder, causing the second light emitting element to emit light onto a measuring position of the scale, and receiving light reflected from or passing through the measuring position using the second light receiving element; and
      a calculating operation of calculating multiple lifetimes of the scale based on a light amount received by the second light receiving element.

2. The printing apparatus according to claim 1, wherein the controller is configured to perform:
   in the measuring operation, receiving lights reflected from or passing through respective multiple measuring positions of the scale using the second light receiving element; and
   in the calculating operation, calculating the multiple lifetimes of the scale based on the light amounts received by the second light receiving element, respectively.

3. The printing apparatus according to claim 2, wherein the controller is configured to perform an excluding operation of excluding part of the multiple measuring positions from subjects of the measuring operation based on a result of comparing a shortest lifetime with other lifetimes other than the shortest lifetime among the multiple lifetimes calculated for the respective multiple measuring positions.

4. The printing apparatus according to claim 3, wherein, in the calculating operation, the controller is configured to perform:
   calculating a first change curve indicating a light amount received by the second light receiving element with respect to a printing amount for a first measuring position among the multiple measuring positions;
   calculating a second change curve indicating a light amount received by the second light receiving element with respect to a printing amount for a second measuring position among the multiple measuring positions;
   calculating a first lifetime printing amount at which a light amount received by the second light receiving element in the first change curve matches a threshold value; and
   calculating a second lifetime printing amount at which a light amount received by the second light receiving element in the second change curve matches the threshold value, and
wherein, when the first lifetime printing amount is the shortest lifetime, in the excluding operation, the controller is configured to perform:

calculating a ratio of the second lifetime printing amount to the first lifetime printing amount; and excluding the second measuring position from subjects of the measuring operation when the ratio is greater than or equal to a first particular value.

5. The printing apparatus according to claim 3, wherein, in the calculating operation, the controller is configured to perform:

calculating a third change curve indicating a light amount received by the second light receiving element with respect to a printing amount for a third measuring position among the multiple measuring positions;

calculating a fourth change curve indicating a light amount received by the second light receiving element with respect to a printing amount for a fourth measuring position among the multiple measuring positions;

calculating a third lifetime printing amount at which a light amount received by the second light receiving element in the third change curve matches a threshold value; and calculating a fourth lifetime printing amount at which a light amount received by the second light receiving element in the fourth change curve matches the threshold value, and wherein, when the third lifetime printing amount is less than the fourth lifetime printing amount, in the excluding operation, the controller is configured to perform:

calculating a ratio of a slope of a tangent line in a current printing amount in the fourth lifetime printing amount to a slope of a tangent line in a current printing amount in the third lifetime printing amount; and excluding the fourth measuring position from subjects of the measuring operation when the ratio is less than or equal to a second particular value.

6. The printing apparatus according to claim 5, wherein the third lifetime printing amount indicates the shortest lifetime.

7. The printing apparatus according to claim 3, wherein, in the calculating operation, the controller is configured to perform:

calculating a fifth change curve indicating a light amount received by the second light receiving element with respect to a printing amount for a fifth measuring position among the multiple measuring positions;

calculating a sixth change curve indicating a light amount received by the second light receiving element with respect to a printing amount for a sixth measuring position among the multiple measuring positions;

calculating a fifth lifetime printing amount at which a light amount received by the second light receiving element in the fifth change curve matches a threshold value; and calculating a sixth lifetime printing amount at which a light amount received by the second light receiving element in the sixth change curve matches the threshold value, and wherein, when the fifth lifetime printing amount is less than the sixth lifetime printing amount, in the excluding operation, the controller is configured to perform:

when the printing amount is x, the light amount received by the second light receiving element is y and a formula for the fifth change curve is $y=ae^{bx}$, calculating a coefficient b of the formula for the fifth change curve;

when the printing amount is x, the light amount received by the second light receiving element is y and a formula for the sixth change curve is $y=ae^{bx}$ and when a corrected formula for the sixth change curve is $y=ae^{bx}+c$ in a case where the sixth change curve is corrected from a current printing amount in such a manner that the printing amount matches the fifth lifetime printing amount, calculating a correction coefficient b of the corrected formula for the sixth change curve;

calculating a ratio of the correction coefficient b with respect to the coefficient b;

determining whether the ratio of the correction coefficient b is greater than or equal to a third particular value; and excluding the sixth measuring position from subjects of the measuring operation when determining that the ratio of the correction coefficient b is greater than or equal to the third particular value.

8. The printing apparatus according to claim 7, wherein the fifth lifetime printing amount indicates the shortest lifetime.

9. The printing apparatus according to claim 1, further comprising an output device configured to output information, wherein the controller is configured to cause the output device to output information indicating options for a lifetime extending process of the scale.

10. A control method for a printing apparatus including: a head configured to eject ink on a recording medium; a carriage including the head; an encoder including a scale, a first light emitting element and a first light receiving element, the scale being elongated along a moving direction of the carriage, the first light emitting element being mounted on the carriage and configured to emit light toward the scale, the first light receiving element being mounted on the carriage and configured to receive light emitted from the first light emitting element and reflected from or passing through the scale, the encoder being configured to output a signal corresponding to an amount of light received by the first light receiving element; and a measuring sensor including a second light emitting element and a second light receiving element, the second light emitting element being mounted on the carriage and configured to emit light toward the scale, the second light receiving element being mounted on the carriage and configured to receive light emitted from the second light emitting element and reflected from or passing through the scale, wherein the control method comprises:

causing the head to eject ink while moving the carriage based on a signal output by the encoder;

moving the carriage based on a signal output by the encoder, causing the second light emitting element to emit light onto a measuring position of the scale, and receiving light reflected from or passing through the measuring position using the second light receiving element; and calculating multiple lifetimes of the scale based on an amount of light received by the second light receiving element.

11. A non-transitory computer-readable storage medium for a printing apparatus including a head configured to eject ink on a recording medium, a carriage including the head, an encoder including a scale, a first light emitting element and a first light receiving element, the scale being elongated along a moving direction of the carriage, the first light emitting element being mounted on the carriage and configured to emit light toward the scale, the first light receiving element being mounted on the carriage and configured to receive light emitted from the first light emitting element and reflected from or passing through the scale, the encoder being configured to output a signal corresponding to an amount of light received by the first light receiving element, and a measuring sensor including a second light emitting element and a second light receiving element, the second light emitting element being mounted on the carriage and configured to emit light toward the scale, the second light receiving element being mounted on the carriage and configured to receive light emitted from the second light emitting element and reflected from or passing through the scale, wherein the non-transitory computer-readable storage medium contains computer-executable instructions, the computer-executable instructions being configured to, when executed by a controller of the printing apparatus, cause the printing apparatus to perform:

causing the head to eject ink while moving the carriage based on a signal output by the encoder;

moving the carriage based on a signal output by the encoder, causing the second light emitting element to emit light onto a measuring position of the scale, and receiving light reflected from or passing through the measuring position using the second light receiving element; and calculating multiple lifetimes of the scale based on an amount of light received by the second light receiving element.

12. A printing apparatus comprising:
a head configured to eject ink on a recording medium;
a carriage including the head;
an encoder including a scale, a light emitting element and a light receiving element, the scale being elongated along a moving direction of the carriage, the light emitting element being mounted on the carriage and configured to emit light toward the scale, the light receiving element being mounted on the carriage and configured to receive light emitted from the light emitting element and reflected from or passing through the scale, the encoder being configured to output a signal corresponding to a light amount received by the light receiving element; and
a controller configured to perform:
a printing operation of causing the head to eject ink while moving the carriage based on a signal output by the encoder;
a measuring operation of moving the carriage based on a signal output by the encoder, causing the light emitting element to emit light onto a measuring position of the scale, and receiving light reflected from or passing through the measuring position using the light receiving element; and
a calculating operation of calculating multiple lifetimes of the scale based on a light amount received by the light receiving element.

13. The printing apparatus according to claim 12, wherein the controller is configured to perform:
in the measuring operation, receiving lights reflected from or passing through respective multiple measuring positions of the scale using the light receiving element; and

in the calculating operation, calculating multiple lifetimes of the scale based on the light amounts received by the light receiving element, respectively.

14. The printing apparatus according to claim 13, wherein the controller is configured to perform an excluding operation of excluding part of the multiple measuring positions from subjects of the measuring operation based on a result of comparing a shortest lifetime with other lifetimes other than the shortest lifetime among the multiple lifetimes calculated for the respective multiple measuring positions.

15. The printing apparatus according to claim 14, wherein, in the calculating operation, the controller is configured to perform:
calculating a first change curve indicating a light amount received by the light receiving element with respect to a printing amount for a first measuring position among the multiple measuring positions;
calculating a second change curve indicating a light amount received by the light receiving element with respect to a printing amount for a second measuring position among the multiple measuring positions;
calculating a first lifetime printing amount at which a light amount received by the light receiving element in the first change curve matches a threshold value; and
calculating a second lifetime printing amount at which a light amount received by the light receiving element in the second change curve matches the threshold value, and
wherein, when the first lifetime printing amount indicates the shortest lifetime, in the excluding operation, the controller is configured to perform:
calculating a ratio of the second lifetime printing amount to the first lifetime printing amount; and
excluding the second measuring position from subjects of the measuring operation when the ratio is greater than or equal to a first particular value.

16. The printing apparatus according to claim 14, wherein, in the calculating operation, the controller is configured to perform:
calculating a third change curve indicating a light amount received by the light receiving element with respect to a printing amount for a third measuring position among the multiple measuring positions;
calculating a fourth change curve indicating a light amount received by the light receiving element with respect to a printing amount for a fourth measuring position among the multiple measuring positions;
calculating a third lifetime printing amount at which a light amount received by the light receiving element in the third change curve matches a threshold value; and
calculating a fourth lifetime printing amount at which a light amount received by the light receiving element in the fourth change curve matches the threshold value, and
wherein, when the third lifetime printing amount is less than the fourth lifetime printing amount, in the excluding operation, the controller is configured to perform:
calculating a ratio of a slope of a tangent line in a current printing amount in the fourth lifetime printing amount to a slope of a tangent line in a current printing amount in the third lifetime printing amount; and excluding the fourth measuring position from subjects of the measuring operation when the ratio is less than a second particular value.

17. The printing apparatus according to claim 16, wherein the third lifetime printing amount indicates the shortest lifetime.

18. The printing apparatus according to claim 14, wherein, in the calculating operation, the controller is configured to perform:

calculating a fifth change curve indicating a light amount received by the light receiving element with respect to a printing amount for a fifth measuring position among the multiple measuring positions;

calculating a sixth change curve indicating a light amount received by the light receiving element with respect to a printing amount for a sixth measuring position among the multiple measuring positions;

calculating a fifth lifetime printing amount at which a light amount received by the light receiving element in the fifth change curve matches a threshold value; and calculating a sixth lifetime printing amount at which a light amount received by the light receiving element in the sixth change curve matches the threshold value, and wherein, when the fifth lifetime printing amount is less than the sixth lifetime printing amount, in the excluding operation, the controller is configured to perform:

when the printing amount is x, the light amount received by the light receiving element is y and a formula for the fifth change curve is $y=ae^{bx}$, calculating a coefficient b of the formula for the fifth change curve;

when the printing amount is x, the light amount received by the light receiving element is y and a formula for the sixth change curve is $y=ae^{bx}$ and when a corrected formula for the sixth change curve is $y=ae^{bx}+c$ in a case where the sixth change curve is corrected from a current printing amount in such a manner that the printing amount matches the fifth lifetime printing amount, calculating a correction coefficient b of the corrected formula for the sixth change curve;

calculating a ratio of the correction coefficient b with respect to the coefficient b; and excluding the sixth measuring position from subjects of the measuring operation when the ratio of the correction coefficient b is greater than or equal to a third particular value.

19. The printing apparatus according to claim 18, wherein the fifth lifetime printing amount indicates the shortest lifetime.

20. The printing apparatus according to claim 12, further comprising an output device configured to output information, wherein the controller is configured to output information indicating a lifetime extending process of the scale.

21. The printing apparatus according to claim 12, wherein, in the calculating operation, the controller is configured to perform:

calculating a change curve indicating a light amount received by the light receiving element with respect to a printing amount; and calculating, as the lifetimes of the scale, a lifetime printing amount at which a light amount received by the light receiving element in the change curve matches a threshold value.

* * * * *